US012794822B2

(12) United States Patent
Liu et al.

(10) Patent No.: US 12,794,822 B2
(45) Date of Patent: Nov. 10, 2026

(54) METHOD AND APPARATUS FOR DETECTING AND REORDERING DISORDER PACKETS

(71) Applicant: Telefonaktiebolaget LM Ericsson (publ), Stockholm (SE)

(72) Inventors: Daiying Liu, Beijing (CN); Tonghai Gao, Beijing (CN); Haiyin Li, Beijing (CN); Qirong Tang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 123 days.

(21) Appl. No.: 18/847,361

(22) PCT Filed: Mar. 17, 2022

(86) PCT No.: PCT/CN2022/081505
§ 371 (c)(1),
(2) Date: Sep. 16, 2024

(87) PCT Pub. No.: WO2023/173371
PCT Pub. Date: Sep. 21, 2023

(65) Prior Publication Data
US 2025/0202830 A1 Jun. 19, 2025

(51) Int. Cl.
*H04L 47/32* (2022.01)
*H04L 47/2483* (2022.01)

(52) U.S. Cl.
CPC .......... *H04L 47/32* (2013.01); *H04L 47/2483* (2013.01)

(58) Field of Classification Search
CPC ............................ H04L 47/32; H04L 47/2483
See application file for complete search history.

(56) References Cited

U.S. PATENT DOCUMENTS

2005/0249119 A1* 11/2005 Elie-Dit-Cosaque ........................ H04L 12/2856 370/216
2012/0052878 A1* 3/2012 Sakama ........... H04B 10/25752 455/456.1

(Continued)

FOREIGN PATENT DOCUMENTS

WO 2007095815 A1 8/2007
WO 2022046607 A1 3/2022

OTHER PUBLICATIONS

Author Unknown, "IEEE Standard for Radio over Ethernet Encapsulations and Mappings," IEEE Standard 1914.3-2018, Sep. 2018, IEEE Standards Association, 77 pages.

(Continued)

*Primary Examiner* — Mohamed A. Wasel
(74) *Attorney, Agent, or Firm* — Withrow & Terranova, PLLC

(57) ABSTRACT

Embodiments of the present disclosure provide methods and apparatuses for detecting and reordering disorder packets. A method performed by a first network node comprises receiving a first packet comprising a header of a first frame from a second network node. A header of the first packet comprises a first timestamp and the first frame comprises one or more second frames. The method further comprises determining respective predicted times of the one or more second frames based on the first timestamp and a time length of a second frame. The respective predicted times of the one or more second frames are used to sort the one or more second frames and/or determine a disorder alarm.

19 Claims, 14 Drawing Sheets

(56) References Cited

U.S. PATENT DOCUMENTS

| | | | |
|---|---|---|---|
| 2013/0100948 A1 | 4/2013 | Irvine | |
| 2015/0281983 A1 | 10/2015 | Garcia | |
| 2018/0049147 A1* | 2/2018 | Chen | H04W 56/0015 |
| 2019/0090099 A1* | 3/2019 | Wang | H04W 4/40 |
| 2020/0252980 A1 | 8/2020 | Anand et al. | |
| 2021/0051494 A1* | 2/2021 | Anand | H04L 41/0654 |

OTHER PUBLICATIONS

International Search Report and Written Opinion for International Patent Application No. PCT/CN2022/081505, mailed Aug. 31, 2022, 9 pages.

Author Unknown, "Draft Standard for Radio over Ethernet Encapsulations and Mappings," Draft Standard P1914.3/D1.7 , IEEE Word Press, vol. 1914, Nov. 2021, IEEE, 245 pages.

Extended European Search Report for European Patent Application No. 22931406.7, mailed Sep. 25, 2025, 10 pages.

* cited by examiner

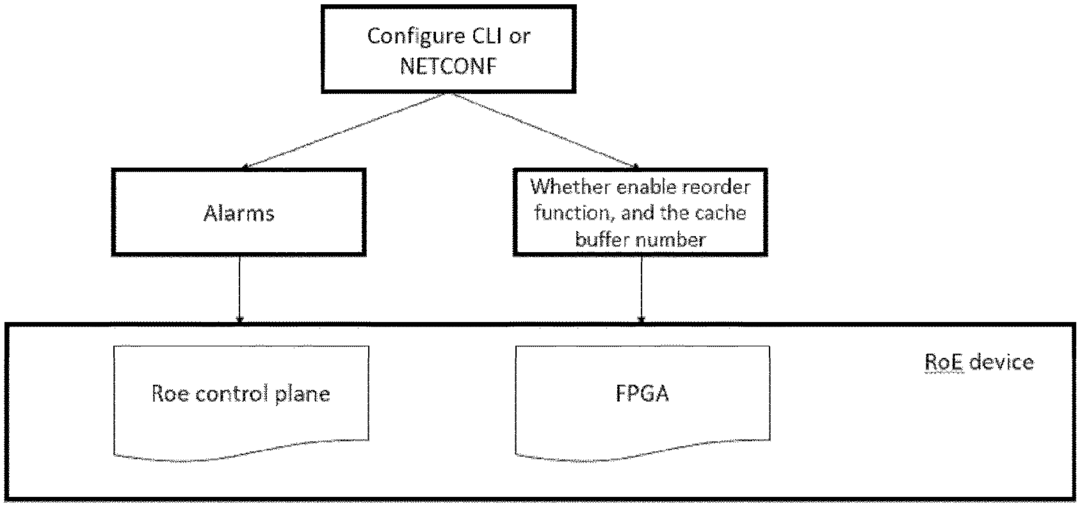
FIG. 22
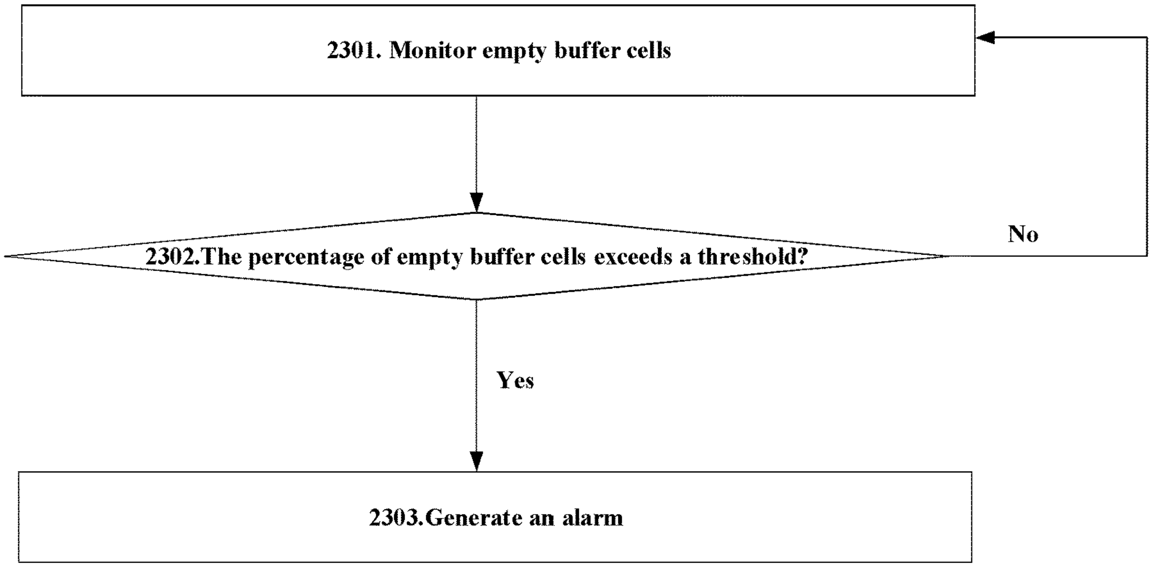
FIG. 23
| Session DST MAC | Session SRC MAC | VLAN | Ether Type | RoE PKT Version and Type | Flow ID | Length | Message Type | Reason |
|---|---|---|---|---|---|---|---|---|
| 6 Bytes | 6 Bytes | 4 or 8 Bytes | 2 Bytes: FC3D | 1 Byte | 1 Byte | 2 Byte | 1 Byte | 1 Byte |
FIG. 24

METHOD AND APPARATUS FOR DETECTING AND REORDERING DISORDER PACKETS

This application is a 35 U.S.C. § 371 national phase filing of International Application No. PCT/CN2022/081505, filed Mar. 17, 2022, the disclosure of which is incorporated herein by reference in its entirety.

TECHNICAL FIELD

The non-limiting and exemplary embodiments of the present disclosure generally relate to the technical field of communications, and specifically to methods and apparatuses for detecting and reordering disorder packets.

BACKGROUND

This section introduces aspects that may facilitate a better understanding of the disclosure. Accordingly, the statements of this section are to be read in this light and are not to be understood as admissions about what is in the prior art or what is not in the prior art.

In a communication system, various interfaces may be defined between two communication devices. For example, common public radio interface (CPRI) is an interface between two communication devices such as radio equipment (RE) and radio equipment control (REC).

FIG. 1 is a diagram illustrating a system architecture with a CPRI link between RE and REC. As shown in FIG. 1, CPRI carries control & management, synchronization, and user data. The term SAP refers to service access point. For example, the control plane and management plane are mapped to $SAP_{CM}$. The user plane is mapped to a $SAP_{IQ}$. The synchronization (Sync) is mapped to a $SAP_{s}$. Each link connects two ports which have asymmetrical functions and roles: a master and a slave. According to CPRI specification 7.0, the disclosure of which is incorporated by reference herein in its entirety, CPRI line rate can be selected from 10 options: 614.4 Mbps, 1228.8 Mbps, 2457.6 Mbps, 3072.0 Mbps, 4915.2 Mbps, 6144.0 Mbps, 9830.4 Mbps, 10137.6 Mbps, 12165.12 Mbps, and 24330.24 Mbps. At initial start-up procedure, REC and RE can do auto-negotiation on the line rate.

Institute of electrical and electronics engineers (IEEE) Standard for Radio over Ethernet Encapsulations and Mappings (referred to as IEEE Std 1914.3-2018), the disclosure of which is incorporated by reference herein in its entirety, defines encapsulation and mapping of radio protocols for transport over Ethernet frames, using radio over Ethernet (RoE).

RoE is encapsulation and mapping of radio protocols for transport over Ethernet frames. Radio data is encapsulated into Ethernet frames and forwarded. Ethernet technology has experienced steady and cost-efficient speed and capacity growth, driven by the enterprise, access, and data-center markets, and has inherent characteristics that allow it to satisfy the other expectations. IEEE Std 1914.3-2018 specifies details that allow Ethernet to partake in the new RoE transport networking solution for cellular service such as 5G (fifth generation) cellular services.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

For RoE packets, the playing sequence of RoE packets (when the RoE packets are converted into CPRI frames and sent to a connected device such as BBU (Baseband Unit) or RRU (Remote Radio Unit)) is required strictly order preserving. That is, the playing sequence and sending sequence must be exactly the same.

It is required that the sequence of decapsulation (converting RoE packets into CPRI frames) on a RoE demapper device must be exactly the same as the sequence of encapsulation (converting CPRI frames into RoE packets) on a RoE mapper device. Otherwise, problems may occur.

FIG. 2 shows an example of a normal case of RoE traffic according to an embodiment of the present disclosure.

In the normal case, the sending order of RoE mapper device is RoE packet 1, RoE packet 2, RoE packet 3, and RoE packet 4. The receiving order of RoE demapper device is RoE packet 1, RoE packet 2, RoE packet 3, and RoE packet 4. There is no issue of RoE packets disorder.

FIG. 3 shows an example of an abnormal case of RoE traffic according to an embodiment of the present disclosure.

In the abnormal case, the sending order of RoE mapper device is RoE packet 1, RoE packet 2, RoE packet 3, and RoE packet 4. The receiving order of RoE demapper device is RoE packet 1, RoE packet 4, RoE packet 2, and RoE packet 3. There is an issue of RoE packets disorder. The data may be broken due to RoE packets disorder. Some unexpected/strange phenomenon may happen. It is obviously that the service may be unacceptably broken.

Packet disorder may be a common phenomenon on any data forwarding plane. For Ethernet forwarding, either the forwarding path change caused by Media Access Control (MAC) address learning, or Link Aggregation (LAG), may cause packet disorder.

There is no good solution in RoE industry now. A probable solution is fixed configuration on whole Ethernet forwarding network, fixed MAC address and avoid any LAG on every node in the Ethernet. By this solution, it can guarantee that there is no RoE (RoE packet is Ethernet Packet) packets disorder. But this solution is obviously not feasible. For example, the operation and maintenance cost is too high. And more serious is that most time it is impossible to have full control on every node in the Ethernet.

To overcome or mitigate at least one of the above mentioned problems or other problems, an improved solution for detecting and reordering disorder packets may be desirable.

In a first aspect of the disclosure, there is provided a method performed by a first network node. The method comprises receiving a first packet comprising a header of a first frame from a second network node. A header of the first packet comprises a first timestamp and the first frame comprises one or more second frames. The method further comprises determining respective predicted times of the one or more second frames based on the first timestamp and a time length of a second frame. The respective predicted times of the one or more second frames are used to sort the one or more second frames and/or determine a disorder alarm.

In an embodiment, the first packet further comprises at least one second frame, the method further comprises determining respective time of the at least one second frame comprised in the first packet based on the first timestamp and the time length of the second frame. The method further comprises filling the at least one second frame comprised in the first packet into at least one corresponding first buffer cell based on the determined respective time of the at least one second frame comprised in the first packet. The method further comprises, when a time indicated by the first timestamp is reached, sending the at least one second frame in the at least one corresponding first buffer cell to a communication device connected to the first network node.

In an embodiment, the method further comprises receiving a second packet comprising at least one second frame from the second network node. A header of the second packet comprises a second timestamp. The method further comprises determining respective time of the at least one second frame comprised in the second packet based on the second timestamp and the time length of the second frame. The method further comprises comparing the determined respective time of the at least one second frame comprised in the second packet with the respective predicted times of the one or more second frames. The method further comprises filling the at least one second frame comprised in the second packet into at least one corresponding second buffer cell based on a comparison result. The method further comprises, when a time indicated by the second timestamp is reached, sending the at least one second frame in the at least one corresponding second buffer cell to a communication device connected to the first network node.

In an embodiment, the communication device connected to the first network node comprises at least one of a Baseband Unit (BBU), a Remote Radio Unit (RRU), a Radio Equipment Control (REC), or a Radio Equipment (RE).

In an embodiment, the first frame is a common public radio interface (CPRI) hyper frame and the second frame is a CPRI basic frame.

In an embodiment, the packet received from the second network node is an Ethernet packet.

In an embodiment, the method further comprises determining a percentage of empty buffer cells for a flow identifier when a time is reached to send at least one second frame in at least one buffer cell to a communication device connected to the first network node. The method further comprises, when the percentage of empty buffer cells exceeds a threshold, generating a disorder alarm for the flow identifier.

In an embodiment, the method further comprises sending the disorder alarm to a network management device.

In an embodiment, the method further comprises recording the disorder alarm in the first network node.

In an embodiment, the method further comprises sending a message to a second network node. The message informs the second network node to stop a traffic of the flow identifier. The method further comprises stopping the traffic of the flow identifier.

In an embodiment, the message comprises at least one of a message type indicating that the message is used to inform a peer network node to stop a traffic of the flow identifier, or a reason indicating stopping the traffic of the flow identifier.

In an embodiment, the method further comprises determining a disorder packet event based on a sequence number of a packet for a flow identifier received from the second network node. The method further comprises enabling a reorder function in the first network node based on the disorder packet event.

In an embodiment, the method further comprises receiving a message comprising a first indication of enabling a reorder function in the first network node from a network management device. The method further comprises enabling the reorder function in the first network node based on the first indication.

In an embodiment, the method further comprises receiving a message comprising a second indication of enabling a disorder alarm function in the first network node from a network management device. The method further comprises enabling the disorder alarm function in the first network node based on the second indication.

In an embodiment, the method further comprises receiving a message comprising a third indication of a number of buffer cells. The method further comprises configuring buffer cells based on the number of buffer cells.

In an embodiment, the first network node is a Radio over Ethernet (RoE) device and the second network node is a RoE device.

In a second aspect of the disclosure, there is provided a method performed by a second network node. The method comprises sending at least one packet to a first network node. The at least one packet comprises a header of a first frame and one or more second frames, a header of each of the at least one packet comprises a timestamp and the first frame comprises one or more second frames. The method further comprises receiving a message from the first network node. The message informs the second network node to stop a traffic of a flow identifier. The method further comprises stopping the traffic of the flow identifier. Respective predicted times of the one or more second frames are determined based on a timestamp of a packet comprising the header of the first frame and a time length of a second frame and are used to sort the one or more second frames and/or determine a disorder alarm.

In an embodiment, the message comprises at least one of a message type indicating that the message is used to inform a peer network node to stop a traffic of the flow identifier, or a reason indicating stopping the traffic of the flow identifier.

In an embodiment, the method further comprises receiving the header of the first frame and the one or more second frames from a communication device connected to the second network node. The method further comprises mapping the header of the first frame and the one or more second frames to the at least one packet.

In an embodiment, the communication device connected to the second network node comprises at least one of a Baseband Unit (BBU), a Remote Radio Unit (RRU), a Radio Equipment Control (REC), or a Radio Equipment (RE).

In an embodiment, the first frame is a common public radio interface (CPRI) hyper frame and the second frame is a CPRI basic frame.

In an embodiment, the at least one packet is an Ethernet packet.

In an embodiment, the first network node is a Radio over Ethernet (RoE) device and the second network node is a RoE device.

In a third aspect of the disclosure, there is provided a first network node. The first network node comprises a processor and a memory coupled to the processor. Said memory contains instructions executable by said processor. Said first network node is operative to receive a first packet comprising a header of a first frame from a second network node. A header of the first packet comprises a first timestamp and the first frame comprises one or more second frames. Said first network node is further operative to determine respective predicted times of the one or more second frames based on the first timestamp and a time length of a second frame. The respective predicted times of the one or more second frames are used to sort the one or more second frames and/or determine a disorder alarm.

In a fourth aspect of the disclosure, there is provided a second network node. The second network node comprises a processor and a memory coupled to the processor. Said memory contains instructions executable by said processor. Said second network node is operative to send at least one packet to a first network node. The at least one packet comprises a header of a first frame and one or more second frames, a header of each of the at least one packet comprises a timestamp and the first frame comprises one or more second frames. Said second network node is further operative to receive a message from the first network node. The message informs the second network node to stop a traffic of a flow identifier. Said second network node is further operative to stop the traffic of the flow identifier. Respective predicted times of the one or more second frames are determined based on a timestamp of a packet comprising the header of the first frame and a time length of a second frame and are used to sort the one or more second frames and/or determine a disorder alarm.

In a fifth aspect of the disclosure, there is provided a first network node. The first network node comprises a first receiving module configured to receive a first packet comprising a header of a first frame from a second network node. A header of the first packet comprises a first timestamp and the first frame comprises one or more second frames. The first network node further comprises a first determining module configured to determine respective predicted times of the one or more second frames based on the first timestamp and a time length of a second frame. The respective predicted times of the one or more second frames are used to sort the one or more second frames and/or determine a disorder alarm.

In an embodiment, the first packet further comprises at least one second frame. The first network node further comprises a second determining module configured to determine respective time of the at least one second frame comprised in the first packet based on the first timestamp and the time length of the second frame. The first network node further comprises a first filling module configured to fill the at least one second frame comprised in the first packet into at least one corresponding first buffer cell based on the determined respective time of the at least one second frame comprised in the first packet. The first network node further comprises a first sending module configured to, when a time indicated by the first timestamp is reached, send the at least one second frame in the at least one corresponding first buffer cell to a communication device connected to the first network node.

In an embodiment, the first network node further comprises a second receiving module configured to receive a second packet comprising at least one second frame from the second network node. A header of the second packet comprises a second timestamp.

In an embodiment, the first network node further comprises a third determining module configured to determine respective time of the at least one second frame comprised in the second packet based on the second timestamp and the time length of the second frame.

In an embodiment, the first network node further comprises a comparing module configured to compare the determined respective time of the at least one second frame comprised in the second packet with the respective predicted times of the one or more second frames.

In an embodiment, the first network node further comprises a second filling module configured to fill the at least one second frame comprised in the second packet into at least one corresponding second buffer cell based on a comparison result.

In an embodiment, the first network node further comprises a second sending module configured to, when a time indicated by the second timestamp is reached, sending the at least one second frame in the at least one corresponding second buffer cell to a communication device connected to the first network node.

In an embodiment, the first network node further comprises a fourth determining module configured to determine a percentage of empty buffer cells for a flow identifier when a time is reached to send at least one second frame in at least one buffer cell to a communication device connected to the first network node.

In an embodiment, the first network node further comprises a generating module configured to, when the percentage of empty buffer cells exceeds a threshold, generate a disorder alarm for the flow identifier.

In an embodiment, the first network node further comprises a third sending module configured to send the disorder alarm to a network management device.

In an embodiment, the first network node further comprises a recording module configured to record the disorder alarm in the first network node.

In an embodiment, the first network node further comprises a fourth sending module configured to send a message to a second network node. The message informs the second network node to stop a traffic of the flow identifier.

In an embodiment, the first network node further comprises a stopping module configured to stop the traffic of the flow identifier.

In an embodiment, the first network node further comprises a fifth determining module configured to determine a disorder packet event based on a sequence number of a packet for a flow identifier received from the second network node.

In an embodiment, the first network node further comprises a first enabling module configured to enable a reorder function in the first network node based on the disorder packet event.

In an embodiment, the first network node further comprises a third receiving module configured to receive a message comprising a first indication of enabling a reorder function in the first network node from a network management device.

In an embodiment, the first network node further comprises a second enabling module configured to enable the reorder function in the first network node based on the first indication.

In an embodiment, the first network node further comprises a fourth receiving module configured to receive a message comprising a second indication of enabling a disorder alarm function in the first network node from a network management device In an embodiment, the first network node further comprises a third enabling module configured to enable the disorder alarm function in the first network node based on the second indication.

In an embodiment, the first network node further comprises a fifth receiving module configured to receiving a message comprising a third indication of a number of buffer cells.

In an embodiment, the first network node further comprises a configuring module configured to configure buffer cells based on the number of buffer cells.

In a sixth aspect of the disclosure, there is provided a second network node. The second network node comprises a sending module configured to send at least one packet to a first network node. The at least one packet comprises a header of a first frame and one or more second frames, a header of each of the at least one packet comprises a timestamp and the first frame comprises one or more second frames. The second network node further comprises a first receiving module configured to receive a message from the first network node. The message informs the second network node to stop a traffic of a flow identifier. The second network node further comprises a stopping module configured to stop the traffic of the flow identifier. Respective predicted times of the one or more second frames are determined based on a timestamp of a packet comprising the header of the first frame and a time length of a second frame and are used to sort the one or more second frames and/or determine a disorder alarm.

In an embodiment, the second network node further comprises a second receiving module configured to receive the header of the first frame and the one or more second frames from a communication device connected to the second network node.

In an embodiment, the second network node further comprises a mapping module configured to map the header of the first frame and the one or more second frames to the at least one packet.

In a seventh aspect of the disclosure, there is provided a computer program product, comprising instructions which, when executed on at least one processor, cause the at least one processor to carry out the method according to any of the above first to second aspects.

In an eighth aspect of the disclosure, there is provided a computer-readable storage medium storing instructions which when executed by at least one processor, cause the at least one processor to carry out the method according to any of the above first to second aspects.

Embodiments herein afford many advantages, of which a non-exhaustive list of examples follows. Some embodiments herein provide a novel packet sorting mechanism (for example based on CPRI rate, Basic Frame (BF) number and timestamp) to solve the above mentioned problems. In some embodiments herein, if the packets are out of order so badly that basic services are affected, some alarms can be reported to tell customer something unexpected happen, this could improve product usability. In some embodiments herein, by the proposed method, it could efficiently avoid RAN (Radio Access Network) crash caused by disorder packets. In some embodiments herein, the network node can report an alarm to let customer aware if the disorder issue is too serious or unacceptable. In some embodiments herein, through the proposed sorting mechanism, the issue of packets disorder which seriously impact RAN service could be avoided or mitigated. In some embodiments herein, a flow such as RoE flow which stops working because too many disorder packets can be automatically stopped to decrease transmission pressure. The disorder event could be reported to customer to avoid further service issues. In some embodiments herein, the proposed solution can provide packet automation sort function. In some embodiments herein, the proposed solution can provide a function of traffic control based on flow packet order status. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 22 shows a flowchart of a configuration method according to an embodiment of the present disclosure;

FIG. 23 shows a flowchart of how to handle serious RoE packets disorder according to an embodiment of the present disclosure;

FIG. 24 shows an example of a new RoE control message according to an embodiment of the present disclosure;

DETAILED DESCRIPTION

Figure 1:
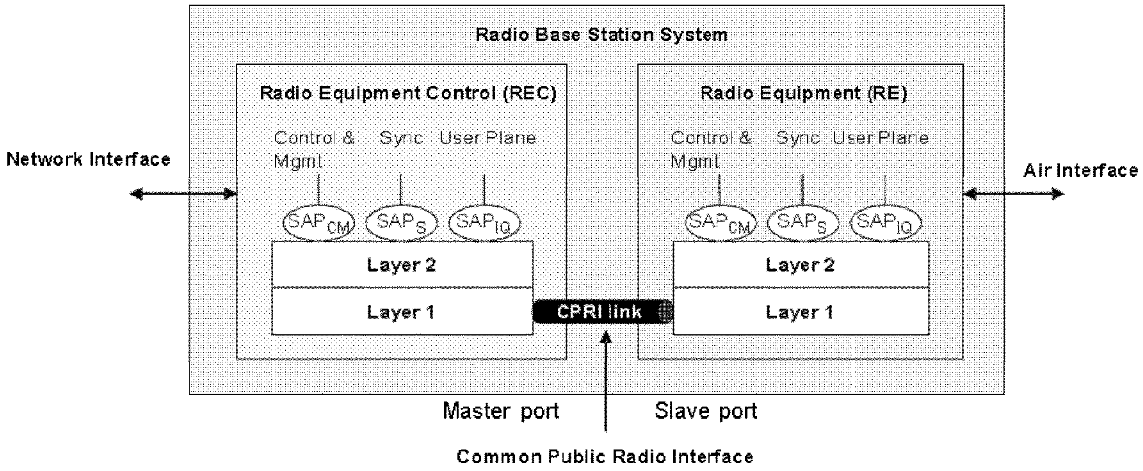
FIG. 1 is a diagram illustrating a system architecture with a CPRI link between RE and REC.
Figure 2:
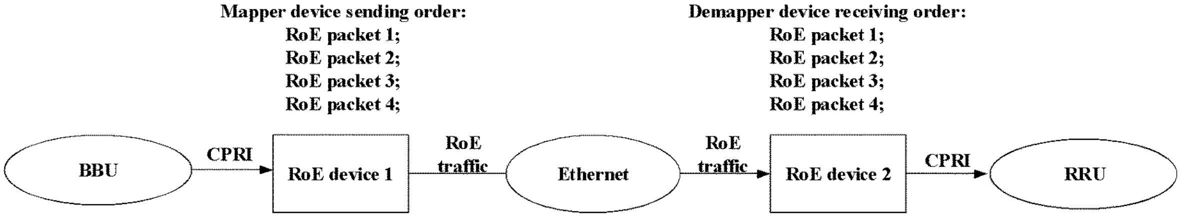
FIG. 2 shows an example of a normal case of RoE traffic according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable communication standards such as new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless or wired networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the communication protocols as defined by a standard organization such as 3rd Generation Partnership Project (3GPP). For example, the communication protocols may comprise the first generation (1G), 2G, 3G, 4G, 4.5G, 5G communication protocols, and/or any other protocols either currently known or to be developed in the future.

The term "network device" or "network node" or "network function (NF)" refers to any suitable function which can be implemented in a network element (physical or virtual) of a communication network. For example, the network function can be implemented either as a network element on a dedicated hardware, as a software instance running on a dedicated hardware, or as a virtualized function instantiated on an appropriate platform, e.g. on a cloud infrastructure.

The network function (NF) can be implemented in a network element (physical or virtual) of a communication network. For example, the network node can be implemented either as a network element on a dedicated hardware, as a software instance running on a dedicated hardware, or as a virtualized function instantiated on an appropriate platform, e.g. on a cloud infrastructure.

Virtualizing means creating virtual versions of apparatuses or devices which may include virtualizing hardware platforms, storage devices and networking resources. As used herein, virtualization can be applied to a provider edge node and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments hosted by one or more of hardware nodes. Further, in embodiments in which the virtual node is not a radio access node or does not require radio connectivity (e.g., a core network node), then the provider edge node or PE may be entirely virtualized.

The functions may be implemented by one or more applications (which may alternatively be called software instances, virtual appliances, network functions, virtual nodes, virtual network functions, etc.) operative to implement some of the features, functions, and/or benefits of some of the embodiments disclosed herein. Applications are run in virtualization environment which provides hardware comprising processing circuitry and memory. Memory contains instructions executable by processing circuitry whereby application is operative to provide one or more of the features, benefits, and/or functions disclosed herein.

Virtualization environment, comprises general-purpose or special-purpose network hardware devices comprising a set of one or more processors or processing circuitry, which may be commercial off-the-shelf (COTS) processors, dedicated Application Specific Integrated Circuits (ASICs), or any other type of processing circuitry including digital or analog hardware components or special purpose processors. Each hardware device may comprise memory which may be non-persistent memory for temporarily storing instructions or software executed by processing circuitry. Each hardware device may comprise one or more network interface controllers (NICs), also known as network interface cards, which include physical network interface. Each hardware device may also include non-transitory, persistent, machine-readable storage media—having stored therein software and/or instructions executable by processing circuitry. Software may include any type of software including software for instantiating one or more virtualization layers (also referred to as hypervisors), software to execute virtual machines as well as software allowing it to execute functions, features and/or benefits described in relation with some embodiments described herein.

Virtual machines, comprise virtual processing, virtual memory, virtual networking or interface and virtual storage, and may be run by a corresponding virtualization layer or hypervisor. Different embodiments of the instance of virtual appliance may be implemented on one or more of virtual machines, and the implementations may be made in different ways.

During operation, processing circuitry executes software to instantiate the hypervisor or virtualization layer, which may sometimes be referred to as a virtual machine monitor (VMM). Virtualization layer may present a virtual operating platform that appears like networking hardware to virtual machine.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrase "at least one of A and B" or "at least one of A or B" should be understood to mean "only A, only B, or both A and B." The phrase "A and/or B" should be understood to mean "only A, only B, or both A and B".

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to RoE and CPRI being used as non-limiting examples for certain exemplary network device and network interface. As such, the description of exemplary embodiments given herein specifically refers to terminology which is directly related thereto. Such terminology is only used in the context of the presented non-limiting examples and embodiments, and does naturally not limit the present disclosure in any way. Rather, any other network device and network interface may equally be utilized as long as exemplary embodiments described herein are applicable.

Figure 4:
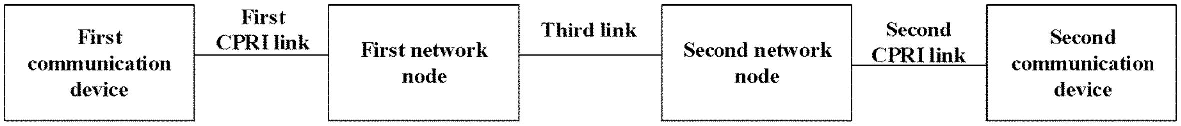
FIG. 4 is a diagram illustrating an exemplary communication system into which an embodiment of the disclosure is applicable.

FIG. 4 is a diagram illustrating an exemplary communication system into which an embodiment of the disclosure is applicable. As shown, the communication system may comprise a first communication device, a second communication device, a first network node and a second network node. The first communication device and the second communication device may be any suitable communication devices which require information exchange between them. As a first example, the first communication device may be a RE and the second communication device may be a REC. As a second example, the first communication device may be a RE and the second communication device may be a RE. As a third example, the first communication device may be a REC and the second communication device may be a RE. As a fourth example, the first communication device may be a REC and the second communication device may be a REC. As a fifth example, the first communication device may be a part of a radio base station and the second communication device may be another part of the radio base station. As a sixth example, the first communication device may be a Remote Radio Unit (RRU) and the second communication device may be a Baseband Unit (BBU). As a seventh example, the second communication device may be a Remote Radio Unit (RRU) and the first communication device may be a Baseband Unit (BBU).

For example, the radio base station can be a decomposed into two basic building blocks, i.e., the REC and the RE or BBU and RRU. Both parts may be physically separated (i.e., the RE or RRU may be close to the antenna, whereas the REC or BBU may be located in a conveniently accessible site) or both may be co-located as in a conventional radio base station design. The REC or BBU may contain the radio functions of the digital baseband domain, whereas the RE or RRU may contain the analogue radio frequency functions. The functional split between both parts may be done in such a way that a generic interface based on In-Phase and Quadrature (IQ) data can be defined. For example, for the Universal Mobile Telecommunications System (UMTS) radio access network, the REC or BBU may provide access to the Radio Network Controller via the Iub interface, whereas the RE or RRU may serve as the air interface, called the Uu interface, to the user equipment. For WiMAX (Worldwide Interoperability for Microwave Access), the REC or BBU may provide access to network entities (e.g. other base station, Access Service Network Gateway (ASN-GW)), whereas the RE or RRU may serve as the air interface to the subscriber station/mobile subscriber station (SS/MSS). For Evolved Universal Terrestrial Radio Access (E-UTRA), the REC may provide access to the Evolved Packet Core for the transport of user plane and control plane traffic via S1 interface, whereas the RE or RRU may serve as the air interface to the user equipment. For Global System for Mobile communication (GSM), the REC or BBU may provide access to the Base Station Controller via the Abis interface, whereas the RE may serve as the air interface, called the Um interface, to the mobile station.

The first network node and the second network node may be any suitable network devices which are able to support at least data transmission function. For example, the first network node may be one of a RoE device or a Ethernet device. The second network node may be one of a RoE device or a Ethernet device. In an embodiment, the first network node and the second network node may have the same device type.

As shown, the first network node is connected with the first communication device through a first CPRI link. The second network node is connected with the second communication device through a second CPRI link. Thus, there is a CPRI port in the first network node which is connected to the first communication device. There is a CPRI port in the second network node which is connected to the second communication device. It is noted that though only one CPRI port is shown in each of the first network node and the second network node, there may be two or more CPRI ports in each network device which can be connected to two or more communication devices respectively.

The first network node is connected with the second network node through a third link. Examples of the third link may include, but not limited to, an RoE link or a Ethernet link, etc. Note that there may be other equipment(s) between the first and second network nodes.

In an embodiment, the first network node and the second network node belong to a transport network over which a link connected between the first communication device and the second communication device is bridged. The transport network may be any transport network either currently known or to be developed in the future.

Figure 3:
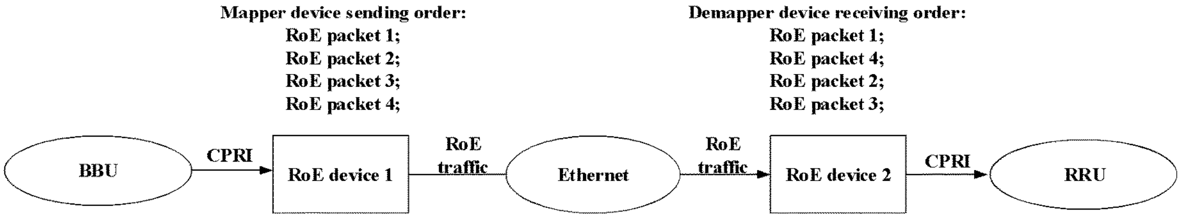
FIG. 3 shows an example of an abnormal case of RoE traffic according to an embodiment of the present disclosure.
Figure 5:
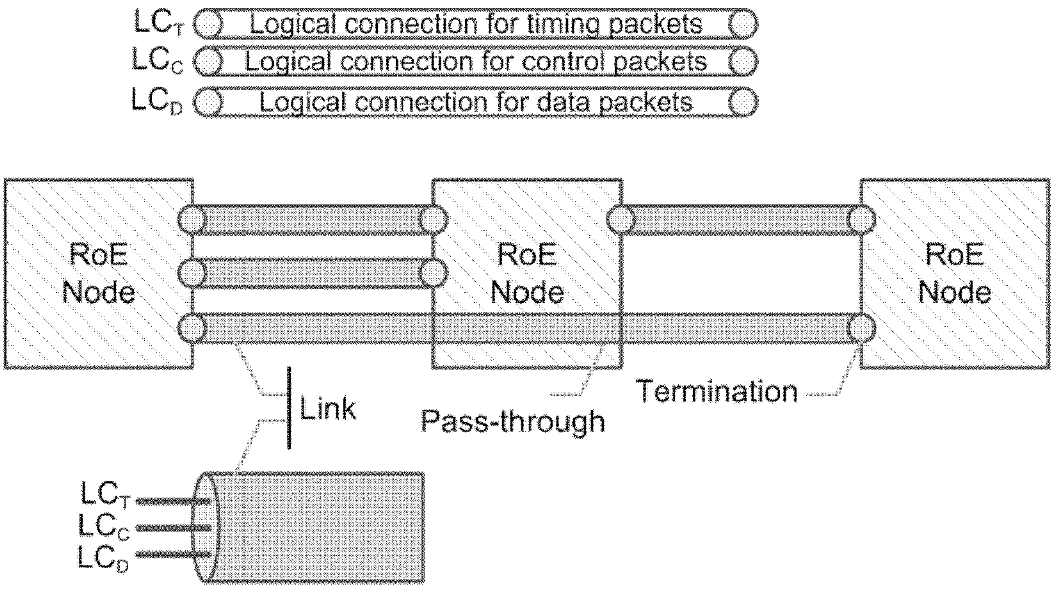
FIG. 5 is a diagram illustrating RoE endpoints and supported functions.

FIG. 5 is a diagram illustrating RoE endpoints and supported functions, which is same as FIG. 3 of IEEE Std 1914.3-2018.

The RoE interface carries three types of traffic over physical links. These physical connections carry the following: Logical connection for control (LCC) packets, which carry control information; Logical connection for data (LCD) packets, which carry I/Q data; and Logical connection for timing (LCT) packets, which carry timing control information. Note that LCT is a subset of LCC.

The three logical connections may be carried over the same physical links or over different physical links. The terms node and RoE node, both meaning an RoE-capable networking instance that is either the originator or the receiver of an RoE communication link. RoE nodes can be endpoints, where RoE traffic is terminated, or pass-through points, where the traffic is forwarded to a following node. A given node can support a mixture of terminated and pass-through traffic. There may be zero or more intermediate networking nodes, acting as RoE pass-through points between RoE endpoints.

Figure 6:
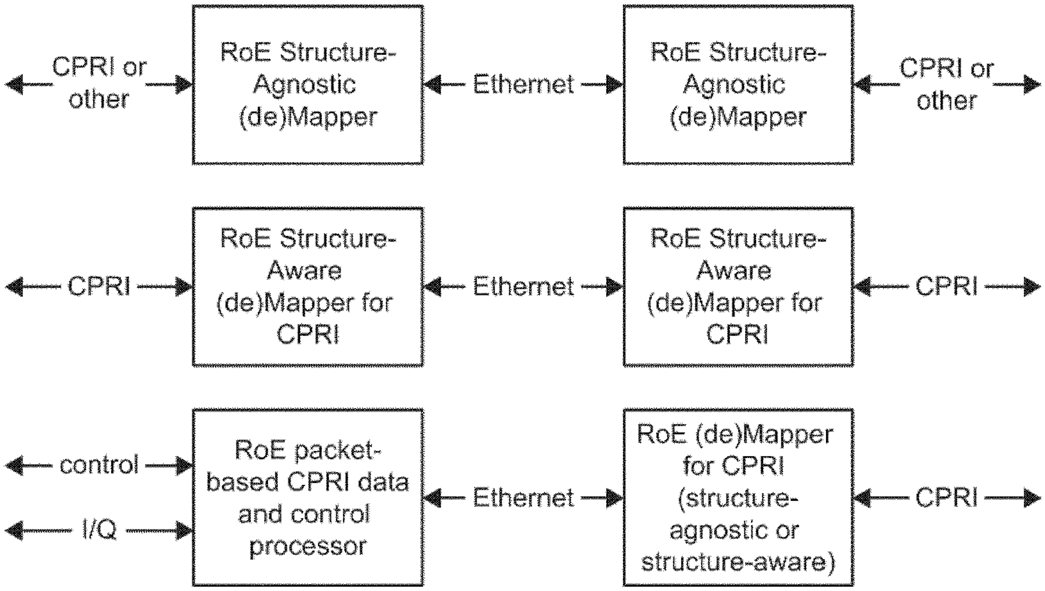
FIG. 6 is a diagram illustrating RoE nodes and supported functions.

FIG. 6 is a diagram illustrating RoE nodes and supported functions, which is same as FIG. 4 of IEEE Std 1914.3-2018.

The IEEE Std 1914.3-2018 supports scenarios where RoE-enabled nodes are connected to legacy CPRI nodes and/or endpoints. Some of these scenarios, using the RoE structure-agnostic and CPRI structure-aware mappers, are shown in FIG. 3. For the first two scenarios, the CPRI stream is mapped into RoE by an RoE mapper and then regenerated by an RoE de-mapper. In the third scenario, a serial CPRI stream exists only at one end. A packet-based CPRI processor, which negates the need for a serial CPRI stream, exists at the other end.

Figure 7:
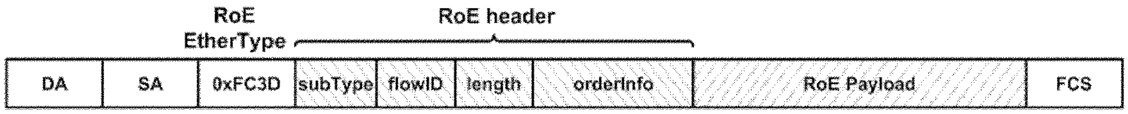
FIG. 7 is a diagram illustrating RoE encapsulation in Ethernet frames.

FIG. 7 is a diagram illustrating RoE encapsulation in Ethernet frames, which is same as FIG. 7 of IEEE Std 1914.3-2018.

DA refers to destination address. SA refers to source address. FCS refers to frame check sequence. The SA, DA, and FCS are implicit to all RoE packets. The RoE EtherType value is specified in 4.2 of IEEE Std 1914.3-2018.

Figure 8:
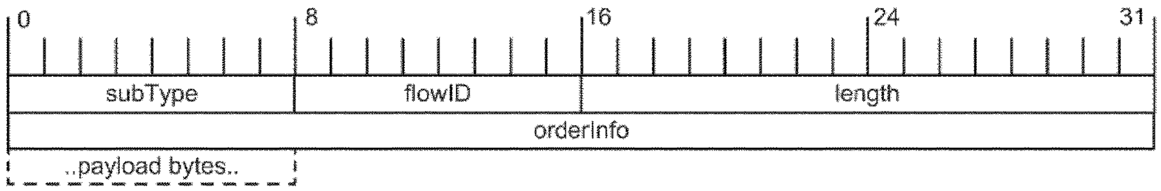
FIG. 8 is a diagram illustrating RoE encapsulation common frame format.

FIG. 8 is a diagram illustrating RoE encapsulation common frame format (the RoE header), which is same as FIG. 8 of IEEE Std 1914.3-2018.

The common RoE frame format has the following header fields: a) subType (subtype) field: 8 bits, b) flowID (flow identifier) field: 8 bits, c) length (length) field: 16 bits [2 most significant bits (MSBs) are reserved for future use by IEEE Std 1914.3-2018], d) orderInfo (timeStamp/seqNum) field: 32 bits.

The RoE common frame header is placed into the transport protocol payload field, which is the Ethernet frame payload field.

The 8-bit subType field is used to define the RoE subtype and the type of flow carried by the RoE packets. The flowID identifies a specific flow between two endpoints. The length (length) field include a value of the length which is the total number of octets following the common RoE header. Ordering information is assigned to each flow and is presented in one of two methods: a sequence number or timestamp.

Figure 9:
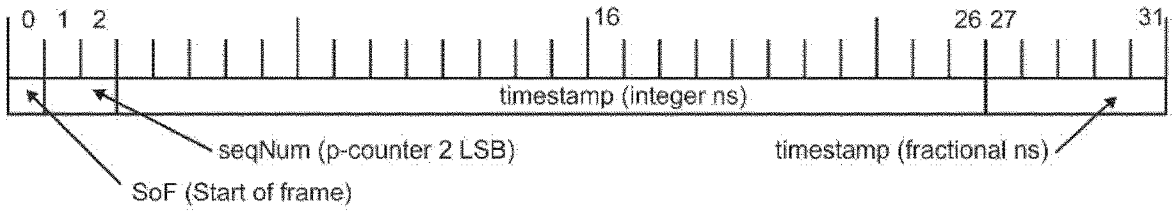
FIG. 9 is a diagram illustrating format of the timeStamp field.
Figure 10:
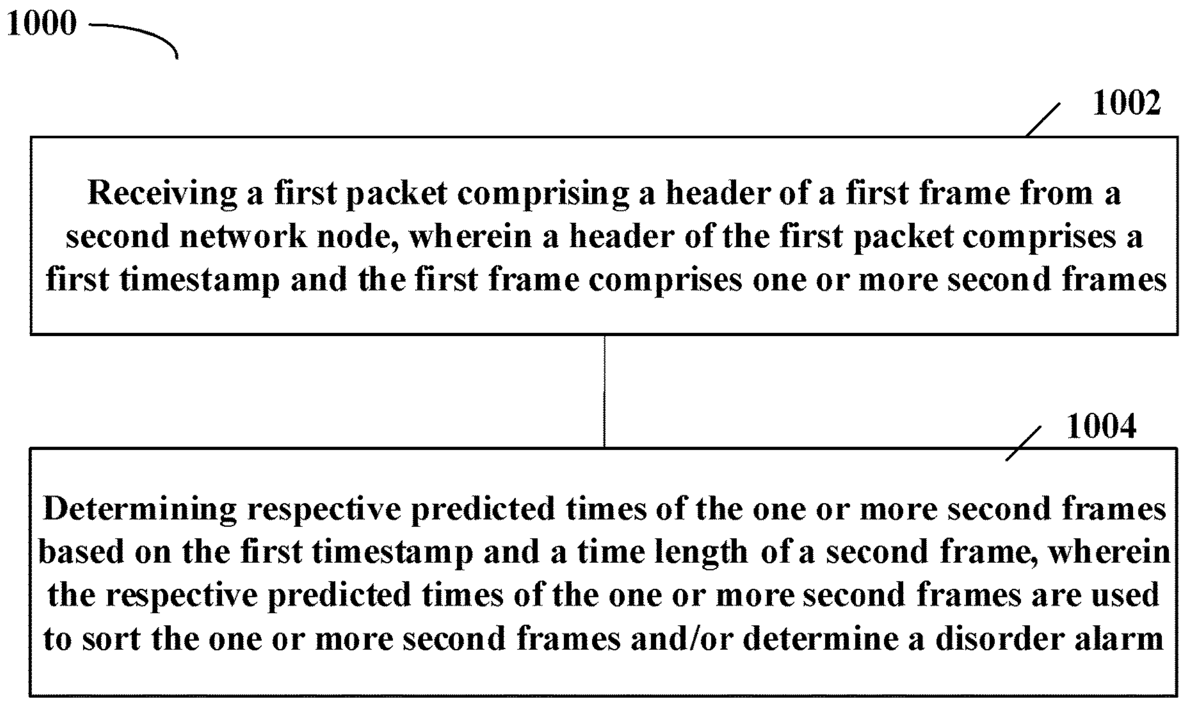
FIG. 10 shows a flowchart of a method according to an embodiment of the present disclosure.

FIG. 9 is a diagram illustrating format of the timeStamp field, which is same as FIG. 10 of IEEE Std 1914.3-2018.

Timestamp mode is a very well-used mode of RoE, there is timestamp field in RoE header in RoE packets generated by the RoE mapper device. It is 32 bits and provides the start-of-frame marker, a condensed sequence number, and the absolute time for presentation of the packet information by the demapper device at the receiving endpoint. In order to use RoE timestamp mode correctly, the RoE device needs to enter the correct presentation time in the timestamp of the RoE header.

This presentation time is a future time that tells the remote RoE end when to replay the RoE packet playload into CPRI and send to the connected device such as BBU (Baseband Unit) or RRU (Remote Radio Unit). If the presentation time is not correct, CPRI frames can't be replayed continuously and the CPRI connection between the baseband unit and the remote radio unit will go down. The presentation time is relative to a reference plane for the mapper and de-mapper, which is itself referenced to a timescale. Both the transmitting and receiving endpoints must be referenced to the same timescale for the information to be presented at the appropriate time. The ToD (time of day) used for the presentation time mechanism shall be tracked with a 24-bit nanosecond counter and a 5-bit fractional nanosecond counter. The presentation time counters at the associated endpoints shall be aligned so that their 29-bit ToD values are consistent (to a specified uncertainty) with the ToD of a counter that started at zero at the chosen common timescale's epoch and that increments with that timescale's definition of the duration of $1/32$ ns.

Bit 0 is the start of frame (SoF) marker and is an indication of a radio frame boundary. An SoF bit is set to 1 indicates that the start of the payload field is the start of the radio frame. An SoF bit is set to 0 indicates that the start of the payload is not the start of the radio frame. For data packets, the orderInfo value is the sequence number or timestamp that applies to the start of the RoE payload data.

Bit 1 and bit 2 contain the 2 least significant bits (LSBs) of the p-counter from the seqNum information.

Bit 3 to bit 26 of the timeStamp field is the integer nanosecond portion of the presentation timestamp. It counts in units of nanoseconds, and the value ranges from 0 ns to 16 777 215 ns (0x0 to 0xFF FFFF, respectively).

Bit 27 to bit 31 of the timeStamp field is the fractional nanosecond portion of the presentation timestamp.

FIG. 10 shows a flowchart of a method according to an embodiment of the present disclosure, which may be performed by an apparatus implemented in or as or communicatively coupled to a first network node or any other entity having similar functionality. As such, the first network node may provide means or modules for accomplishing various parts of the method 1000 as well as means or modules for accomplishing other processes in conjunction with other components.

At block 1002, the first network node may receive a first packet comprising a header of a first frame from a second network node. A header of the first packet comprises a first timestamp and the first frame comprises one or more second frames.

Examples of the first network node and second network node have been described with reference to FIG. 4. In an embodiment, the first network node is a Radio over Ethernet (RoE) device and the second network node is a RoE device.

The first packet may be any suitable packet that can be transmitted from the second network node to the first network node. In an embodiment, the packet received from the second network node may be an Ethernet packet. For example, the first packet may be RoE packet, i.e., RoE encapsulation in Ethernet frames with the timeStamp field as shown in FIGS. 7-9.

The first frame may be any suitable frame and the present disclosure has no limit on it. The second frame may be any suitable frame and the present disclosure has no limit on it. In an embodiment, the first frame is a common public radio interface (CPRI) hyper frame and the second frame is a CPRI basic frame (BF). Examples of CPRI hyper frame and CPRI basic frame have been described in CPRI specification 7.0.

At block 1004, the first network node may determine respective predicted times of the one or more second frames based on the first timestamp and a time length of a second frame. The respective predicted times of the one or more second frames are used to sort the one or more second frames and/or determine a disorder alarm.

For example, the respective predicted times of the one or more second frames may be determined as following: first-timestamp+(n−1)*second-frame-time-length, where n denotes a sequence number of a second frame. For example, if there are 10 second frames comprised in the first frame, then a value range of n may be 1-10.

For example, for CPRI frames, the length of a frame is generally expressed in time as follows:

1 Radio Frame (10 ms)=150 Hyper Frame (66.67 us),

1 Hyper Frame (66.67 us)=256 basic frame (260 ns).

The CPRI rate is usually expressed as option. The mapping between CPRI Option and transmission rate is as follows:

CPRI line bit rate option 1: 614.4 Mbit/s, 8 B/10 B line coding (1×491.52×10/8 Mbit/s)

CPRI line bit rate option 2: 1228.8 Mbit/s, 8 B/10 B line coding (2×491.52×10/8 Mbit/s)

CPRI line bit rate option 3: 2457.6 Mbit/s, 8 B/10 B line coding (4×491.52×10/8 Mbit/s)

CPRI line bit rate option 4: 3072.0 Mbit/s, 8 B/10 B line coding (5×491.52×10/8 Mbit/s)

CPRI line bit rate option 5: 4915.2 Mbit/s, 8 B/10 B line coding (8×491.52×10/8 Mbit/s)

CPRI line bit rate option 6: 6144.0 Mbit/s, 8 B/10 B line coding (10×491.52×10/8 Mbit/s)

CPRI line bit rate option 7: 9830.4 Mbit/s, 8 B/10 B line coding (16×491.52×10/8 Mbit/s)

CPRI line bit rate option 7A: 8110.08 Mbit/s, 64 B/66 B line coding (16×491.52×66/64 Mbit/s)

CPRI line bit rate option 8: 10137.6 Mbit/s, 64 B/66 B line coding (20×491.52×66/64 Mbit/s)

CPRI line bit rate option 9: 12165.12 Mbit/s, 64 B/66 B line coding (24×491.52×66/64 Mbit/s)

CPRI line bit rate option 10: 24330.24 Mbit/s, 64 B/66 B line coding (48×491.52×66/64 Mbit/s)

A parameter of how many BFs are encapsulated in an RoE message may be predefined or configured. This parameter may be used to encapsulate and decapsulate RoE packets. The parameter configurations of RoE devices must be consistent.

When each hyper frame header arrives (e.g., each hyper frame contains 150 BF), because the number of BFs contained in each hyper frame is fixed and the time length of each BF is fixed, the expected time of each BF maybe calculated according to the start time of hyper frame header and the time length of the BF.

Assume the start time of hyper frame is x, then the time of the first BF is (x+0*260 ns)=x ns. The second BF time is (x+1*260 ns)=x+260, and so on.

For example, the respective predicted time of each BF may be determined as following: (HyperFrameTime+(n−1)*260 ns), where n denotes a sequence number of a second frame, 1<=n<=256.

In addition it can mark every pre-allocated cache buffer with the BF predicted time.

Figure 11:
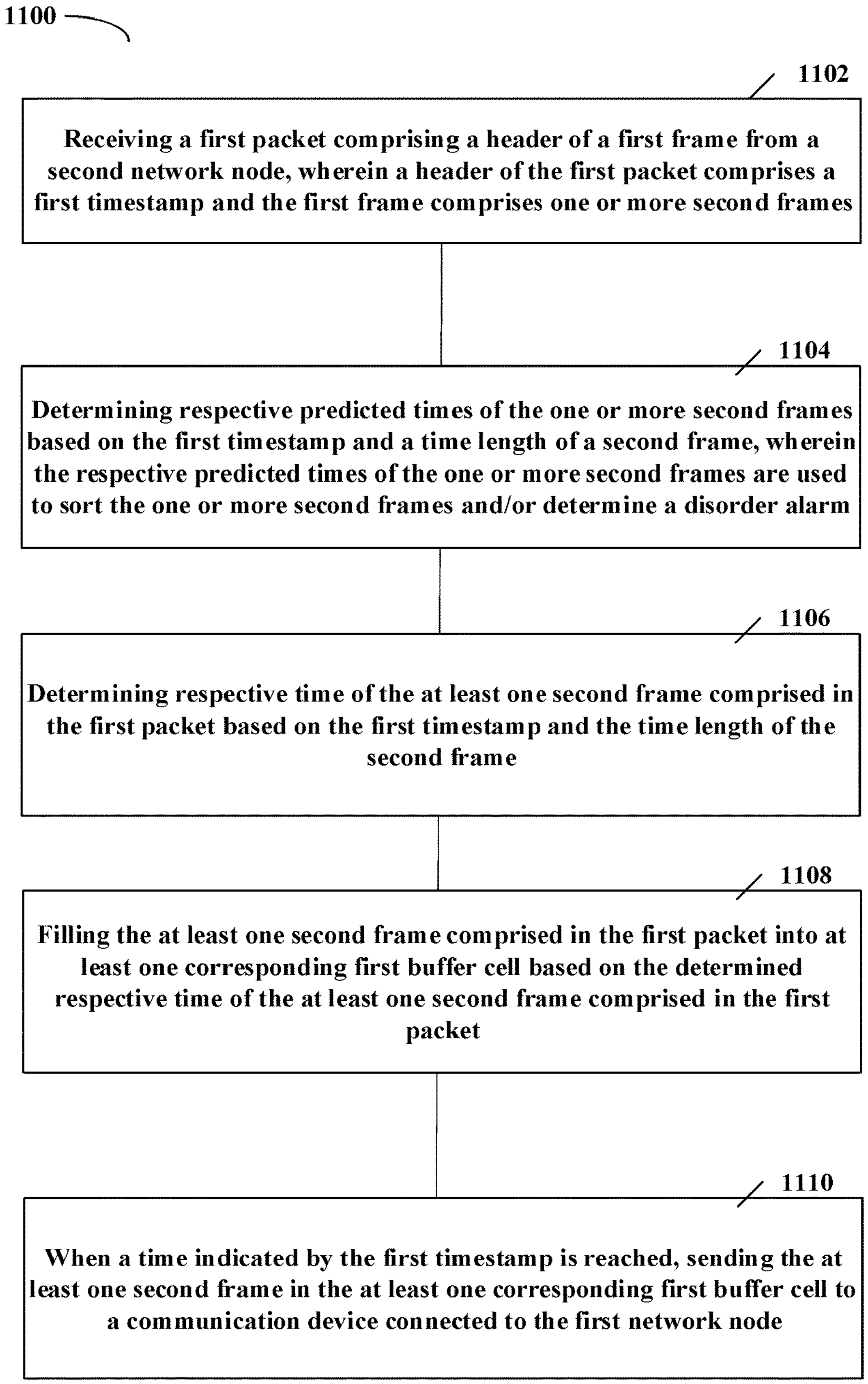
FIG. 11 shows a flowchart of a method according to another embodiment of the present disclosure.

FIG. 11 shows a flowchart of a method according to another embodiment of the present disclosure, which may be performed by an apparatus implemented in or as or communicatively coupled to a first network node or any other entity having similar functionality. As such, the first network node may provide means or modules for accomplishing various parts of the method 1100 as well as means or modules for accomplishing other processes in conjunction with other components. For some parts which have been described in the above embodiments, detailed description thereof is omitted here for brevity.

At block 1102, the first network node may receive a first packet comprising a header of a first frame from a second network node. A header of the first packet comprises a first timestamp and the first frame comprises one or more second frames. Block 1102 is same as block 1002 if FIG. 10.

At block 1104, the first network node may determine respective predicted times of the one or more second frames based on the first timestamp and a time length of a second frame. The respective predicted times of the one or more second frames are used to sort the one or more second frames and/or determine a disorder alarm. Block 1104 is same as block 1004 if FIG. 10.

At block 1106, when the first packet further comprises at least one second frame, the first network node may determine respective time of the at least one second frame comprised in the first packet based on the first timestamp and the time length of the second frame.

For example, the respective time of the at least one second frame comprised in the first packet may be determined as following: first-timestamp+(n−1)*second-frame-time-length, where n denotes a sequence number of a second frame. For example, if there are 10 second frames comprised in the first frame, then a value range of n may be 1-10.

At block 1108, the first network node may fill the at least one second frame comprised in the first packet into at least one corresponding first buffer cell based on the determined respective time of the at least one second frame comprised in the first packet.

For example a parameter of how many second frames or RoE packets can be sorted may be predefined or configured.

The size of the cache buffer needs to be considered to balance the reorder function and resources in the first network node. If the cache buffer size is increased, it can cache more second frames but this will occupy more resources of the first network node. So this parameter may be designed as configurable and customer could adjust the cache buffer size for example based on real network status and requirement.

For example, based on the CPRI rate, the length of each BF can be calculated (this is because basic frames are defined in time, 260 ns per BF). If CPRI is option 7, then the length of each BF may be 2048 bits. 2048 bits may be the size of each reorder buffer cell. If CPRI is option 3, BF length may be 512 bits. 512 bits may be the size of each reorder buffer cell.

The first network node needs to allocate some cache buffer cells for reorder, and each buffer cell may be filled by just one BF.

When each hyper frame header arrives (each hyper frame contains 256 BFs). Because the number of BFs contained in each hyper frame is fixed and the time length of each BF is fixed, the expected (or predicted) time of each BF is calculated according to the start time of hyper frame header and the time length of each BF. Then the first network node can mark every pre-allocated cache buffer cell with a corresponding expected (or predicted) time of a BF.

When the first network node decapsulates the RoE packet and get BFs, the first network node needs to determine a time of a specific BF based on the timestamp comprised in the header of the RoE packet and the time length of the BF. The first network node may compare the time of the specific BF with the predicted time of the specific BF. If they are matched, the first network node may fill the specific BF into a corresponding buffer cell marked with the predicted time of the specific BF.

At block 1110, when a time indicated by the first timestamp is reached, the first network node may send the at least one second frame in the at least one corresponding first buffer cell to a communication device connected to the first network node.

Examples of the communication device connected to the first network node have been described with reference to FIG. 4. In an embodiment, the communication device connected to the first network node comprises at least one of a Baseband Unit (BBU), a Remote Radio Unit (RRU), a Radio Equipment Control (REC), or a Radio Equipment (RE).

For example, when the presentation time is reached to play the cache buffer cells, the first network node can send frames (such as CPRI BF) in the cache buffer cells to a connected device such as BBU or RRU. In this way, out-of-order packets are sorted based on time, and the first network node can send CPRI frames in the correct order.

Figure 12:
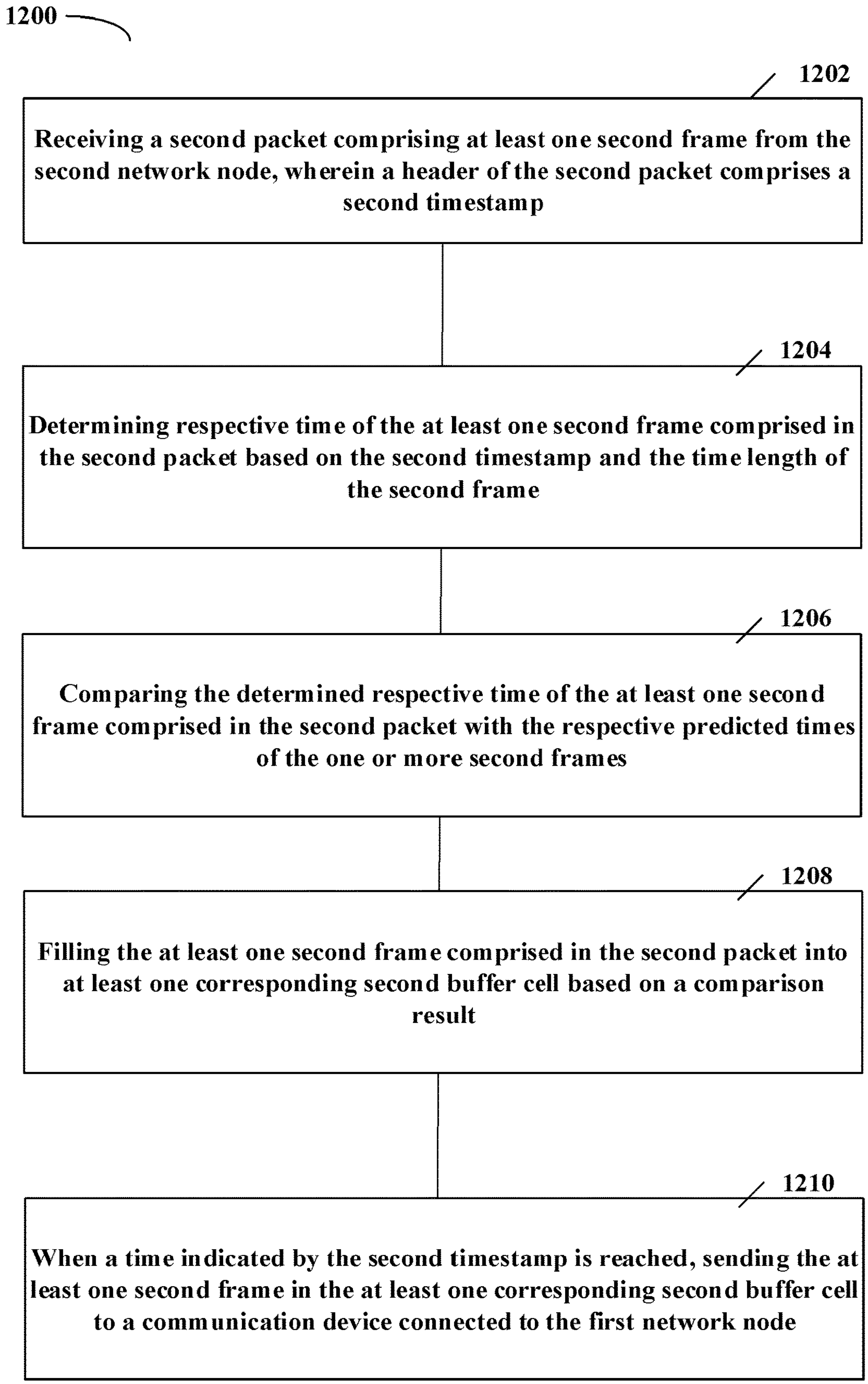
FIG. 12 shows a flowchart of a method according to another embodiment of the present disclosure.

FIG. 12 shows a flowchart of a method according to another embodiment of the present disclosure, which may be performed by an apparatus implemented in or as or communicatively coupled to a first network node or any other entity having similar functionality. As such, the first network node may provide means or modules for accomplishing various parts of the method 1200 as well as means or modules for accomplishing other processes in conjunction with other components. For some parts which have been described in the above embodiments, detailed description thereof is omitted here for brevity.

At block 1202, the first network node may receive a second packet comprising at least one second frame from the second network node. A header of the second packet comprises a second timestamp.

The second packet may be any suitable packet that can be transmitted from the second network node to the first network node. In an embodiment, the packet received from the second network node may be an Ethernet packet. For example, the second packet may be RoE encapsulation in Ethernet frames with the timeStamp field as shown in FIGS. 7-9.

At block 1204, the first network node may determine respective time of the at least one second frame comprised in the second packet based on the second timestamp and the time length of the second frame.

For example, the respective time of the at least one second frame comprised in the second packet may be determined as following: second-timestamp+(n−1)*second-frame-time-length, where n denotes a sequence number of a second frame. For example, if there are 10 second frames comprised in the first frame, then a value range of n may be 1-10.

At block 1206, the first network node may compare the determined respective time of the at least one second frame comprised in the second packet with the respective predicted times of the one or more second frames.

At block 1208, the first network node may fill the at least one second frame comprised in the second packet into at least one corresponding second buffer cell based on a comparison result.

For example, if the determined time of a specific second frame comprised in the second packet matches the predicted time of a second frame, the first network node may fill the specific second frame into a corresponding buffer cell marked with the predicted time of the second frame. Otherwise the at least one second frame comprised in the second packet may be discarded. In addition, the first network node may record a disorder packet event.

At block 1210, when a time indicated by the second timestamp is reached, the first network node may send the at least one second frame in the at least one corresponding second buffer cell to a communication device connected to the first network node.

Examples of the communication device connected to the first network node have been described with reference to FIG. 4. In an embodiment, the communication device connected to the first network node comprises at least one of a Baseband Unit (BBU), a Remote Radio Unit (RRU), a Radio Equipment Control (REC), or a Radio Equipment (RE).

For example, when the presentation time is reached to play the cache buffer cells, the first network node can send frames (such as CPRI BF) in the cache buffer cells to a connected device such as BBU or RRU. In this way, out-of-order packets are sorted based on time, and the first network node can send CPRI frames in the correct order.

In the following, CPRI option 7 is used as an example to explain how to sort the cache buffer cell (or the CPRI BF).

Assume 8 cache buffer cells are configured, then firstly it may get 8 2048 bits empty buffer cells.

Figure 13:
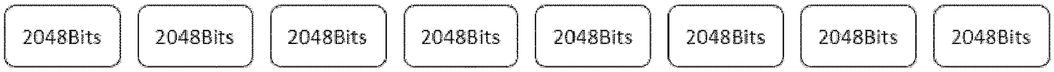
FIG. 13 shows an example of 8 2048 bits empty buffer cells according to an embodiment of the present disclosure.

FIG. 13 shows an example of 8 2048 bits empty buffer cells according to an embodiment of the present disclosure.

Figure 14:
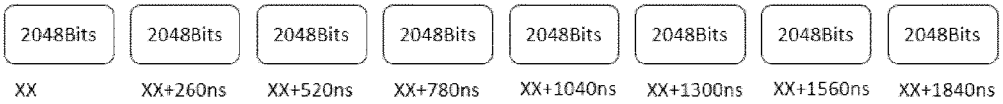
FIG. 14 shows an example of respective predicted times of BFs according to an embodiment of the present disclosure. Each buffer cell is marked with a corresponding predicted time.

FIG. 14 shows an example of respective predicted times of BFs according to an embodiment of the present disclosure. Each buffer cell is marked with a corresponding predicted time.

Figure 15:
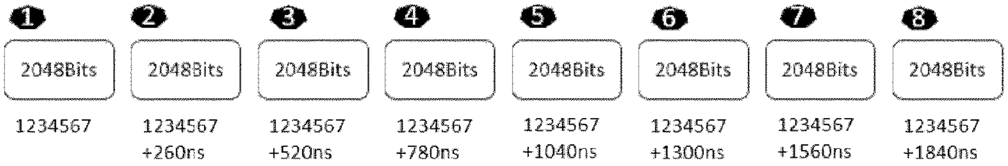
FIG. 15 shows an example of absolute timestamp of every cache buffer cell according to an embodiment of the present disclosure.

FIG. 15 shows an example of absolute timestamp of every cache buffer cell according to an embodiment of the present disclosure.

Because BF time length is fixed to 260 ns, so it can know start/end time for every BF. If the start time of first BF is “XX” nanoseconds, then the first network node may determine respective predicted times of BFs as XX+(n−1)260 ns, where n is the sequence number of BF.

Therefore it needs to know the value of "XX", then it can know the absolute timestamp of every cache buffer cell. It may choose the time (i.e., the first timestamp) of hyper frame header as reference time. Every time the first network node receives hyper frame header, it update the value of "XX". Assume the first network node receives a RoE packet comprising a hyper frame header and the timestamp of the RoE packet is "1234567" nanoseconds, then the first network node can know the absolute timestamp of every cache buffer cell.

For example, after the first network node decapsulates the RoE packets, it may get a header of a hyper frame and several BFs. The first network node may determine respective predicted times of the BFs and respective time of the BFs. The first network node may compare the respective predicted times of the BFs with the respective time of the BFs. If a time of a BF matches a predicted time of a BF, the first network node may fill this BF into a corresponding cache buffer cell marked with the predicted time of the BF. For example, if the first network node gets the BF and its time is determined as "1234567+1560 ns", then the first network node may fill this BF into a cache buffer cell 7 of FIG. 15 and mask this cache buffer cell as used.

When the presentation time is reached, the cache buffer cells should be sent to a device such as BBU or RRU. But if there are some cache buffer cells still not used, the first network node may recorder them and then know a percentage of the disorder packets.

If many cache buffer cells are empty, it may indicate that the disorder issue may be serious and some frames do not arrive within the expected presentation time. Such empty buffer cells need to be recorded.

Figure 16:
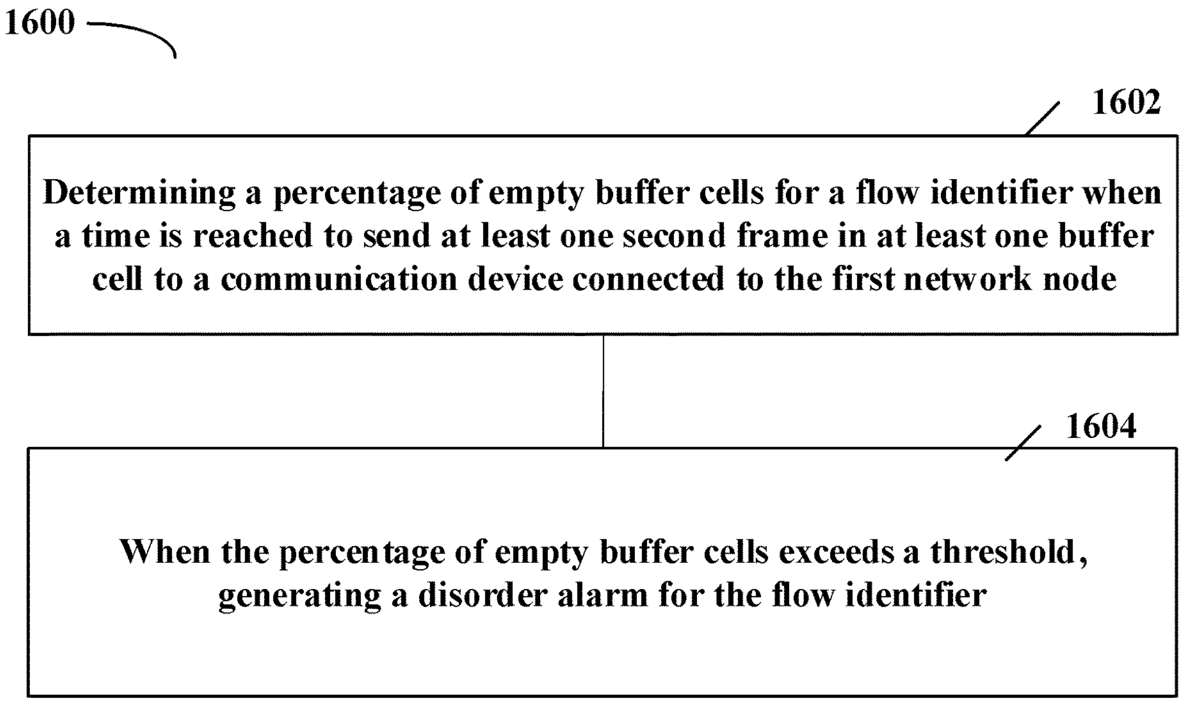
FIG. 16 shows a flowchart of a method according to another embodiment of the present disclosure.

FIG. 16 shows a flowchart of a method according to another embodiment of the present disclosure, which may be performed by an apparatus implemented in or as or communicatively coupled to a first network node or any other entity having similar functionality. As such, the first network node may provide means or modules for accomplishing various parts of the method 1600 as well as means or modules for accomplishing other processes in conjunction with other components. For some parts which have been described in the above embodiments, detailed description thereof is omitted here for brevity.

At block 1602, the first network node may determine a percentage of empty buffer cells for a flow identifier when a time is reached to send at least one second frame in at least one buffer cell to a communication device connected to the first network node. For example, there are 10 buffer cells for a flow identifier. When a time is reached to send at least one second frame in the 10 buffer cells to a communication device connected to the first network node and there are 2 empty buffer cells, the first network node may determine the percentage of empty buffer cells for the flow identifier as 20%.

At block 1604, the first network node may generate a disorder alarm for the flow identifier when the percentage of empty buffer cells exceeds a threshold. The threshold may be any suitable value such as 15%. The threshold may be configured by an operator.

Figure 17:
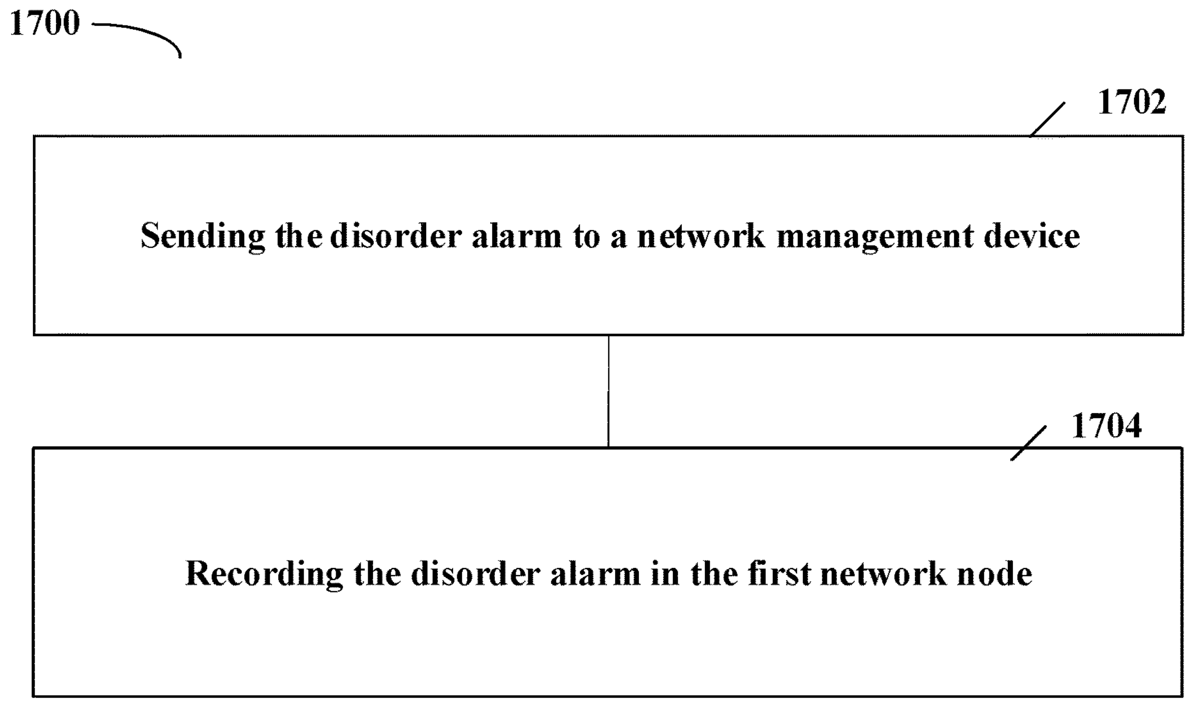
FIG. 17 shows a flowchart of a method according to another embodiment of the present disclosure.

FIG. 17 shows a flowchart of a method according to another embodiment of the present disclosure, which may be performed by an apparatus implemented in or as or communicatively coupled to a first network node or any other entity having similar functionality. As such, the first network node may provide means or modules for accomplishing various parts of the method 1700 as well as means or modules for accomplishing other processes in conjunction with other components. For some parts which have been described in the above embodiments, detailed description thereof is omitted here for brevity.

At block 1702, the first network node may send the disorder alarm to a network management device.

At block 1704, the first network node may record the disorder alarm in the first network node.

Figure 18:
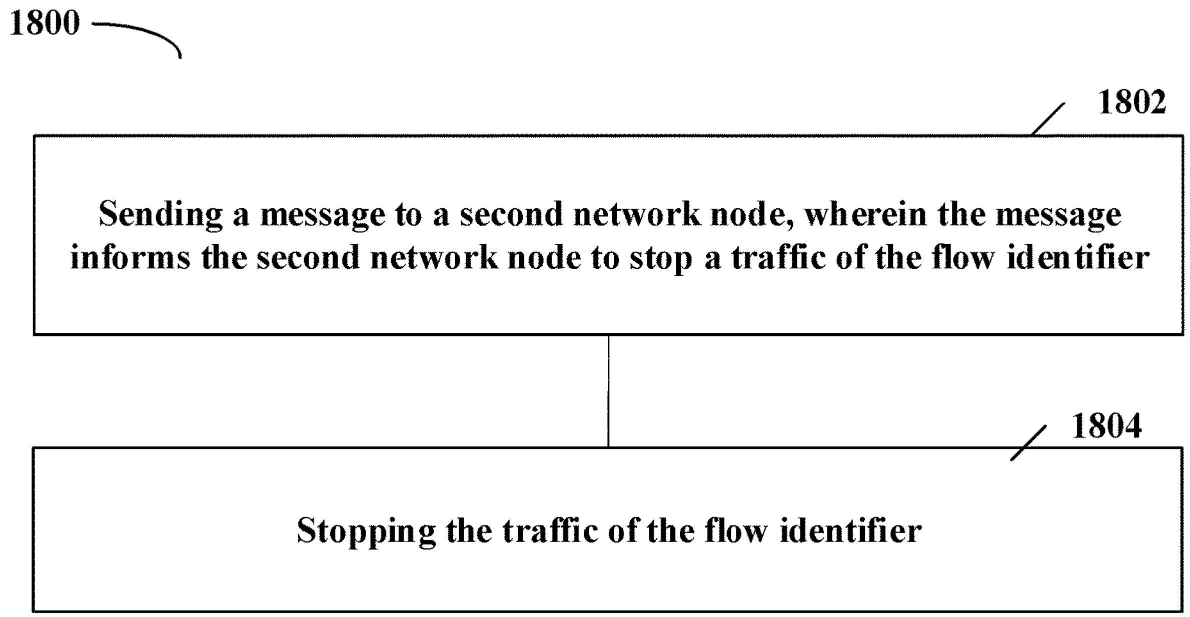
FIG. 18 shows a flowchart of a method according to another embodiment of the present disclosure.

FIG. 18 shows a flowchart of a method according to another embodiment of the present disclosure, which may be performed by an apparatus implemented in or as or communicatively coupled to a first network node or any other entity having similar functionality. As such, the first network node may provide means or modules for accomplishing various parts of the method 1800 as well as means or modules for accomplishing other processes in conjunction with other components. For some parts which have been described in the above embodiments, detailed description thereof is omitted here for brevity.

At block 1802, the first network node may send a message to a second network node. The message informs the second network node to stop a traffic of the flow identifier.

At block 1804, the first network node may stop the traffic of the flow identifier.

In an embodiment, the message comprises at least one of a message type indicating that the message is used to inform a peer network node to stop a traffic of the flow identifier, or a reason indicating stopping the traffic of the flow identifier. For example, the reason may indicate that this message is to stop the traffic because too bad/many RoE packets disorders. The reason may indicate that the percentage of packets disorder is over the pre-configured threshold. The reason may indicate that the percentage of empty buffer cells exceeds a threshold.

Figure 19A:
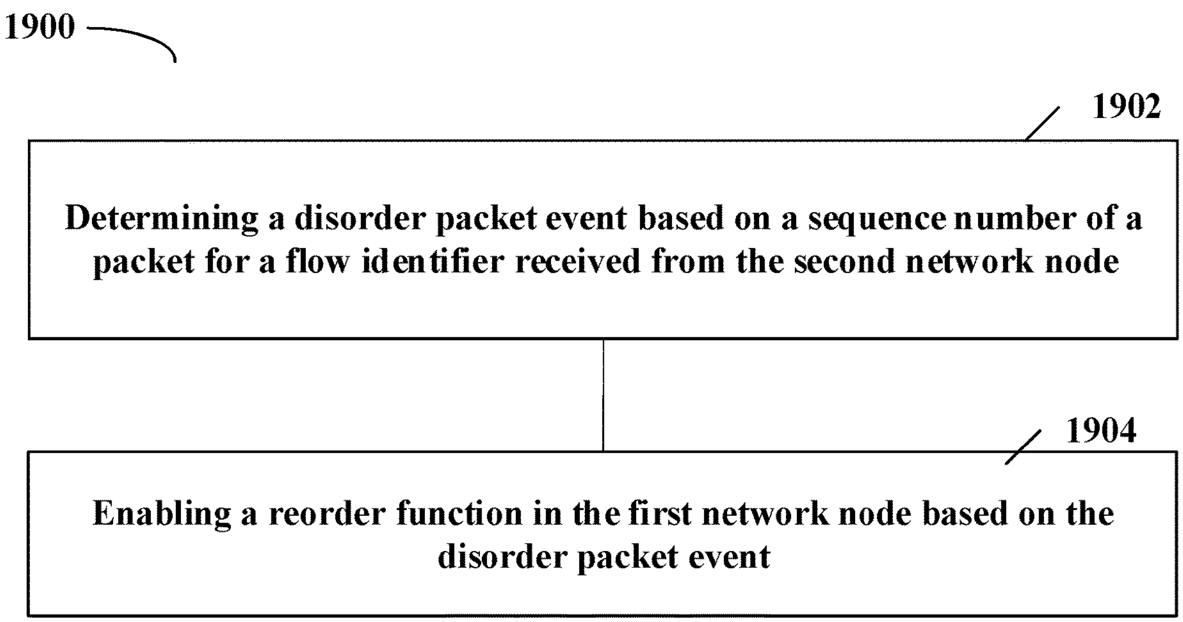
FIG. 19*a* shows a flowchart of a method according to another embodiment of the present disclosure.
Figure 19B:
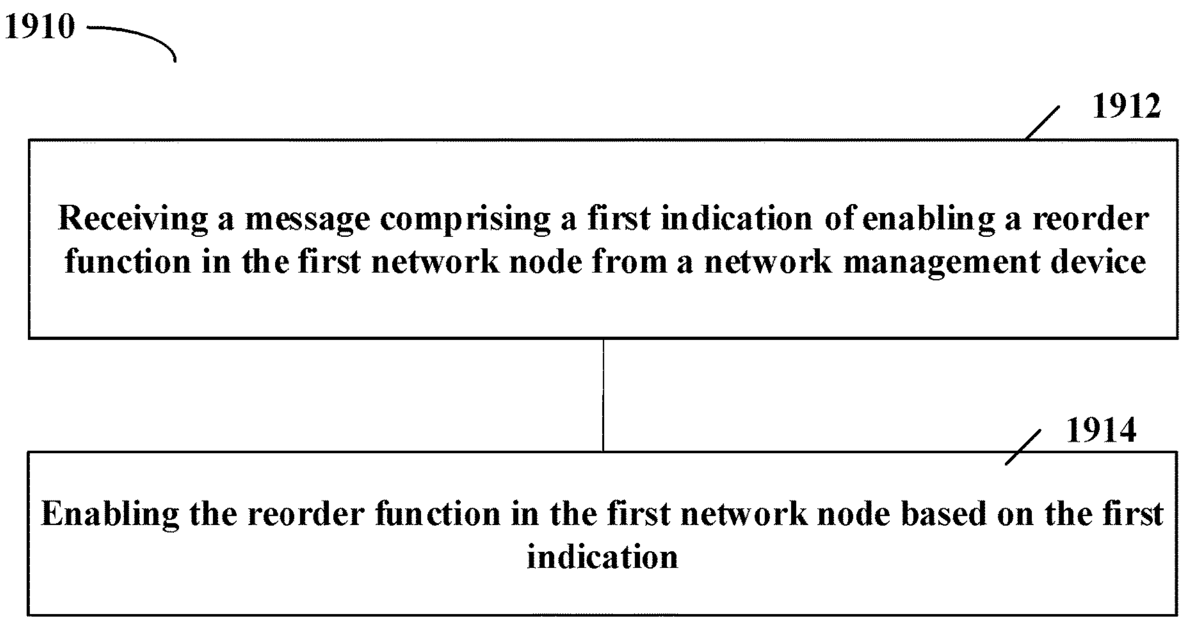
FIG. 19*b* shows a flowchart of a method according to another embodiment of the present disclosure.
Figure 20:
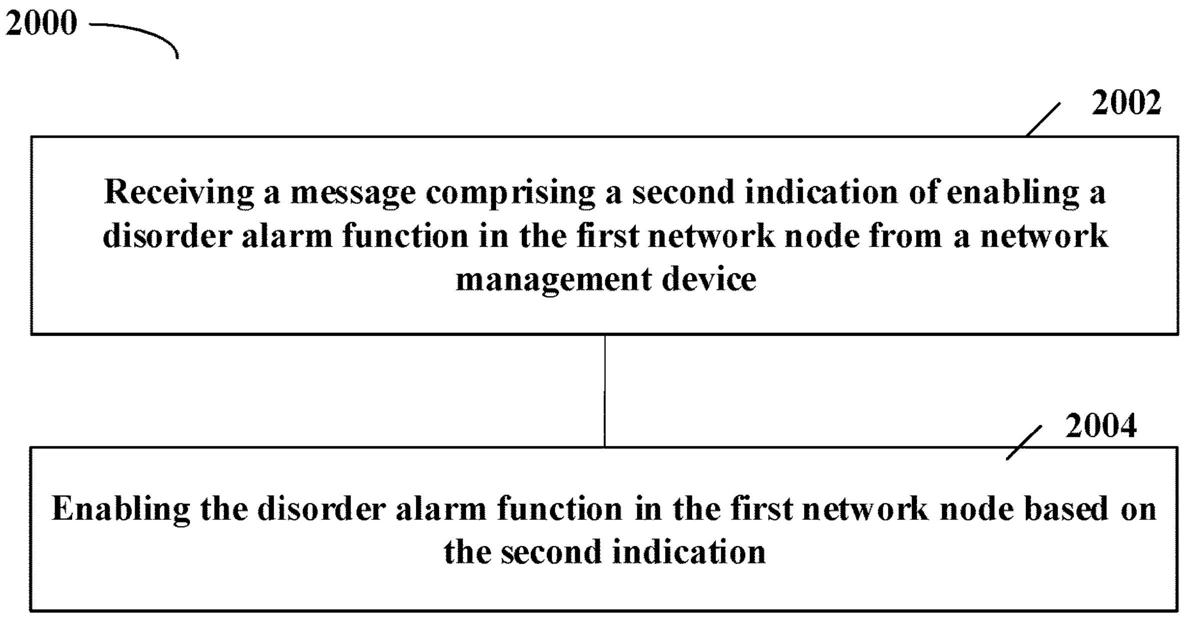
FIG. 20 shows a flowchart of a method according to another embodiment of the present disclosure.

FIG. 19*a* shows a flowchart of a method according to another embodiment of the present disclosure, which may be performed by an apparatus implemented in or as or communicatively coupled to a first network node or any other entity having similar functionality. As such, the first network node may provide means or modules for accomplishing various parts of the method 1900 as well as means or modules for accomplishing other processes in conjunction with other components. For some parts which have been described in the above embodiments, detailed description thereof is omitted here for brevity.

At block 1902, the first network node may determine a disorder packet event based on a sequence number of a packet for a flow identifier received from the second network node.

All the function mentioned herein may be configurable. When the reorder function is disabled, the first network node may provide a packets disorder event detection function.

As shown in FIG. 9, there are 2 bits sequence number in timestamp mode RoE header, which can indicate an order of 4 RoE packets. Although it is far away to handle/reorder the RoE packets by the 2 bits sequence number (Because the 2 bits can only present an order of 4 RoE packets, it is too few), but it should be okay to detect whether there is an event of RoE packet disorder.

The sequence number in timestamp header should increase as a line, if this sequence jumps, the first network node may know that RoE packet is out of order. Here the first network node should count the number of disorder RoE packets and can calculate a percentage of the disorder packets. This information can be displayed to a customer. Customer can set a threshold to report a disorder alarm. For example, if the number of disorder packets is bigger than the threshold, then the first network node may report a disorder alarm (e.g., warning type, minor severity, etc.) and record a log in the first network node to tell the customer an event of disorder packet happens and the customer should take action to handle.

An example of how to detect packet disorder event is as below. If the first network node receives a RoE packet with sequence number 0, then the first network node sets the sequence number of expected next packet to 1. If the sequence number of the next packet is 1, the first network node sets the sequence number of expected next packet to 2. If the sequence number of the next packet is 2, the first network node sets the sequence number of expected next packet to 3. If the sequence number of the next packet is 3, the first network node sets the sequence number of expected next packet to 0. The first network node may repeat the above logic.

If the first network node receives a packet with an unexpected sequence number, for example the sequence number of current expected next packet is 2, but the first network node receives a packet with a sequence number 3, then the first network node knows the packet is out of order. The first network node may increase the disorder packet count and set the sequence number of an expected next packet to 0 because the sequence number of the current received packet is 3. By this method, the first network node could know the received packet count, and the disorder packets count, and can calculate the percentage of disorder packets.

At block 1904, the first network node may enable a reorder function in the first network node based on the disorder packet event. For example, the methods 1000-1800 may be performed the disorder packet event. For example, when the percentage of disorder packets exceeds a threshold, the first network node may enable a reorder function in the first network node. When a disorder packet event is detected, the first network node may enable a reorder function in the first network node.

FIG. **19*b* shows a flowchart of a method according to another embodiment of the present disclosure, which may be performed by an apparatus implemented in or as or communicatively coupled to a first network node or any other entity having similar functionality. As such, the first network node may provide means or modules for accomplishing various parts of the method 1910** as well as means or modules for accomplishing other processes in conjunction with other components. For some parts which have been described in the above embodiments, detailed description thereof is omitted here for brevity.

At block 1912, the first network node may receive a message comprising a first indication of enabling a reorder function in the first network node from a network management device.

At block 1914, the first network node may enable the reorder function in the first network node based on the first indication. For example, the methods 1000-1800 may be performed according to the first indication.

FIG. **20*b* shows a flowchart of a method according to another embodiment of the present disclosure, which may be performed by an apparatus implemented in or as or communicatively coupled to a first network node or any other entity having similar functionality. As such, the first network node may provide means or modules for accomplishing various parts of the method 2000** as well as means or modules for accomplishing other processes in conjunction with other components. For some parts which have been described in the above embodiments, detailed description thereof is omitted here for brevity.

At block 2002, the first network node may receive a message comprising a second indication of enabling a disorder alarm function in the first network node from a network management device.

At block 2004, the first network node may enable the disorder alarm function in the first network node based on the second indication. For example, the methods 1600-1700 may be performed according to the second indication.

Figure 21:
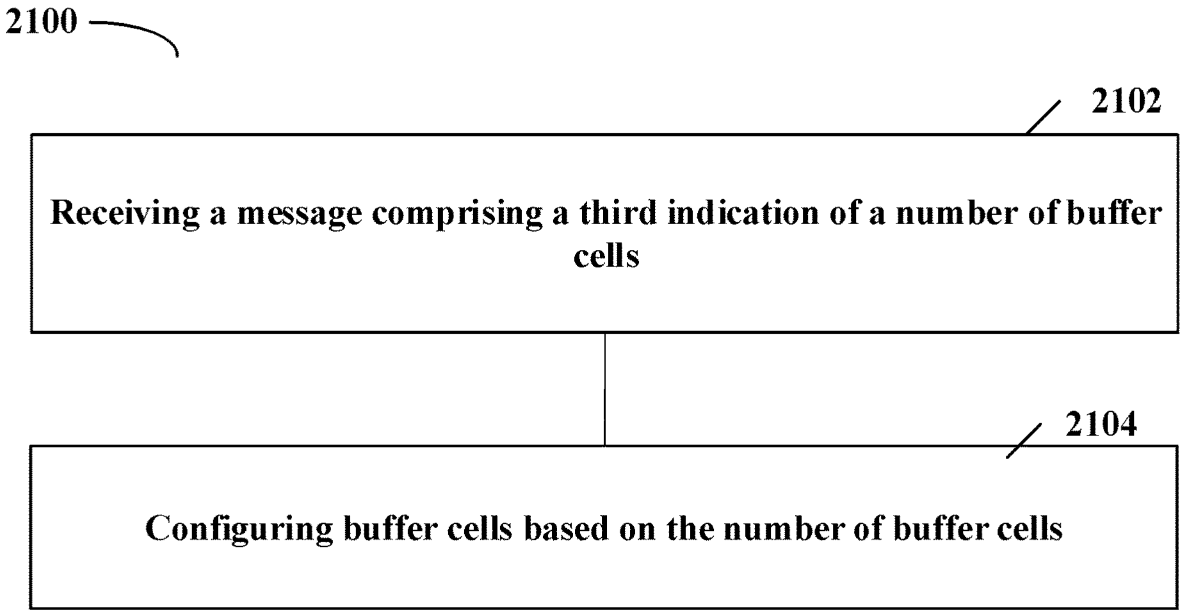
FIG. 21 shows a flowchart of a method according to another embodiment of the present disclosure.

FIG. 21 shows a flowchart of a method according to another embodiment of the present disclosure, which may be performed by an apparatus implemented in or as or communicatively coupled to a first network node or any other entity having similar functionality. As such, the first network node may provide means or modules for accomplishing various parts of the method 2100 as well as means or modules for accomplishing other processes in conjunction with other components. For some parts which have been described in the above embodiments, detailed description thereof is omitted here for brevity.

At block 2102, the first network node may receive a message comprising a third indication of a number of buffer cells.

At block 2104, the first network node may configure buffer cells based on the number of buffer cells.

FIG. 22 shows a flowchart of a configuration method according to an embodiment of the present disclosure.

Whether enabling the packets reorder function, and how many cache buffer in the first network node such as RoE device may be configurable to provide deployment flexibility. Also whether the first network node reports packets disorder alarms may be configurable. For example some customers may treat packets disorder alarms very seriously, so it should have the ability to process or press the packets disorder alarm in some use case.

As shown in FIG. 22, whether enable alarms function, whether enable reorder function, and the number cache buffer cell may be configured by configuration Command Line Interface or network configuration (NETCONF) protocol. The RoE device may comprise RoE control plane and FPGA (Field Programmable Gate Array).

FIG. 23 shows a flowchart of how to handle serious RoE packets disorder according to an embodiment of the present disclosure.

If there are too many disordered RoE packets in a flow, then the buffer cells may be not enough to cover all of disordered RoE packets. This flow should obviously stop working from service perspective so as to the first network node should provide the ability to report such serious event.

At step 2301, the first network node such as RoE device monitors empty buffer cells. For example, if some cache buffer cells are empty even if the presentation time is reached, the first network node should recorder it.

At step 2302, the first network node determines whether the percentage of empty buffer cells exceeds a threshold. The first network node can calculate the percentage of empty cache buffer cells as described above.

At step 2303, if the percentage of empty cache buffer cells exceeds a threshold (e.g., 15%), the first network node generates an alarm. For example, if the percentage of empty cache buffer cells exceeds the threshold (e.g., 15%), it means the RoE packets disorder issue is very serious or unacceptable, and the service over this RoE flow can't keep working. So the first network node may generate an alarm (e.g., with error type, major or above severity), and record a log in a local system.

If the percentage of empty cache buffer cells does not exceed the threshold (e.g., 15%), the method may return to step 2301.

In an embodiment, if there are too many disordered packets in a flow, then the buffer cells may be not enough to cover all of disordered packets. This flow should obviously stop working from service perspective but the traffic of this flow is still ongoing. This is a waste of network resources because the network is keeping transmitting the data never work. So a solution is provided to identify and stop such traffic automatically.

FIG. 24 shows an example of a new RoE control message according to an embodiment of the present disclosure.

DST MAC: Ethernet packet destination MAC;

SRC MAC: Ethernet packet source MAC;

VLAN (Virtual Local Area Network): Ethernet packet VLAN type and ID;

Ether Type: FC3D, required by IEEE Std 1914.3-2018;

RoE PKT Version and Type: Fix to 0, indicate this is a control packet;

Flow ID: RoE session flow ID, the unique ID to identify one RoE session;

Length: Cover everything after this field, in octets; Fixed to 2 byte for this packet format;

Message Type: Indicates that this message is used to inform remote end to stop RoE traffic of this flow;

Reason: Indicates that this message is to stop the traffic because too bad RoE packets disorder.

The "Message Type" and "Reason" are newly introduced into the new RoE control message.

As mentioned above, if some cache buffer cells are empty even if the presentation time reached, the first network node should recorder it. The first network node can calculate the percentage of empty cache buffer cells. if the percentage exceeds a threshold (e.g., 15%), it may mean the packets disorder issue is very serious or unacceptable and the service over on this RoE flow can't keep working. So the first network node should send a control message to a peer network device (e.g., the second network node) to notify stopping the traffic of the flow. The first network node may stop local traffic of the flow simultaneously.

For the first network node, it should delete/block current RoE encapsulation/decapsulation in FPGA table. For the second network device, it should also do the same thing (delete/block RoE session) when receiving the control message from the first network node.

Figure 25:
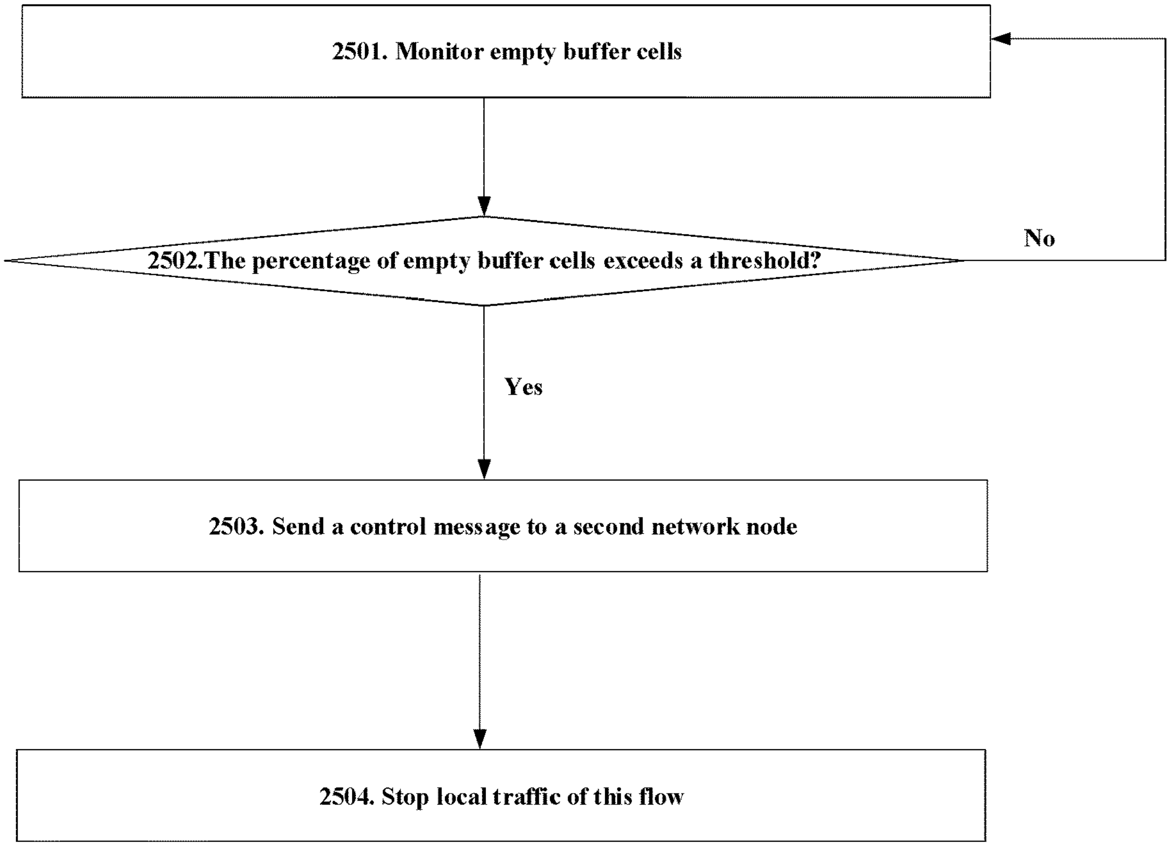
FIG. 25 shows a flowchart of the first network node stopping a traffic of a flow according to an embodiment of the present disclosure.

FIG. 25 shows a flowchart of the first network node stopping a traffic of a flow according to an embodiment of the present disclosure.

At step 2501, the first network node such as RoE device monitors empty buffer cells for a flow.

At step 2502, the first network node determines whether the percentage of empty buffer cells for the flow exceeds a threshold.

At step 2503, if the percentage of empty cache buffer cells exceeds the threshold (e.g., 15%), the first network node sends a control message to a second network node. The control message informs the second network node to stop a traffic of the flow.

At step 2504, the first network node stops local traffic of this flow. The first network node may further generate an alarm.

Figure 26:
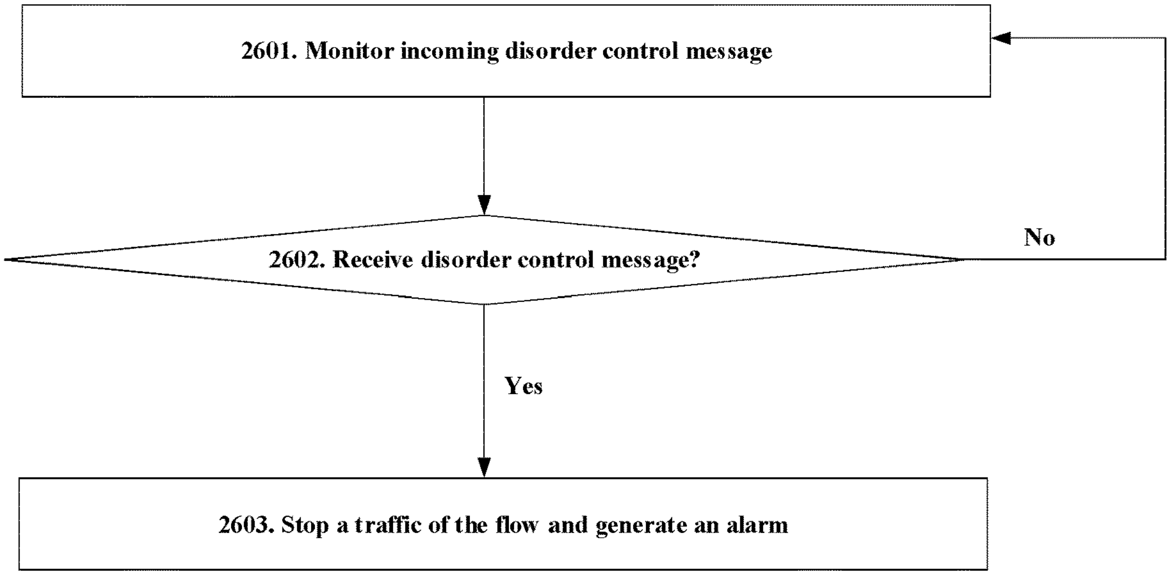
FIG. 26 shows a flowchart of the second network node stopping a traffic of a flow according to an embodiment of the present disclosure.

FIG. 26 shows a flowchart of the second network node stopping a traffic of a flow according to an embodiment of the present disclosure.

At step 2601, the second network node such as RoE device monitors incoming disorder control message from a first network node. The control message informs the second network node to stop a traffic of a flow.

At step 2602, the second network node determines whether the disorder control message is received from the first network node.

At step 2603, if the control message is received from the first network node, the second network node stops a traffic of the flow. In addition, the second network node may generate an alarm.

Figure 27:
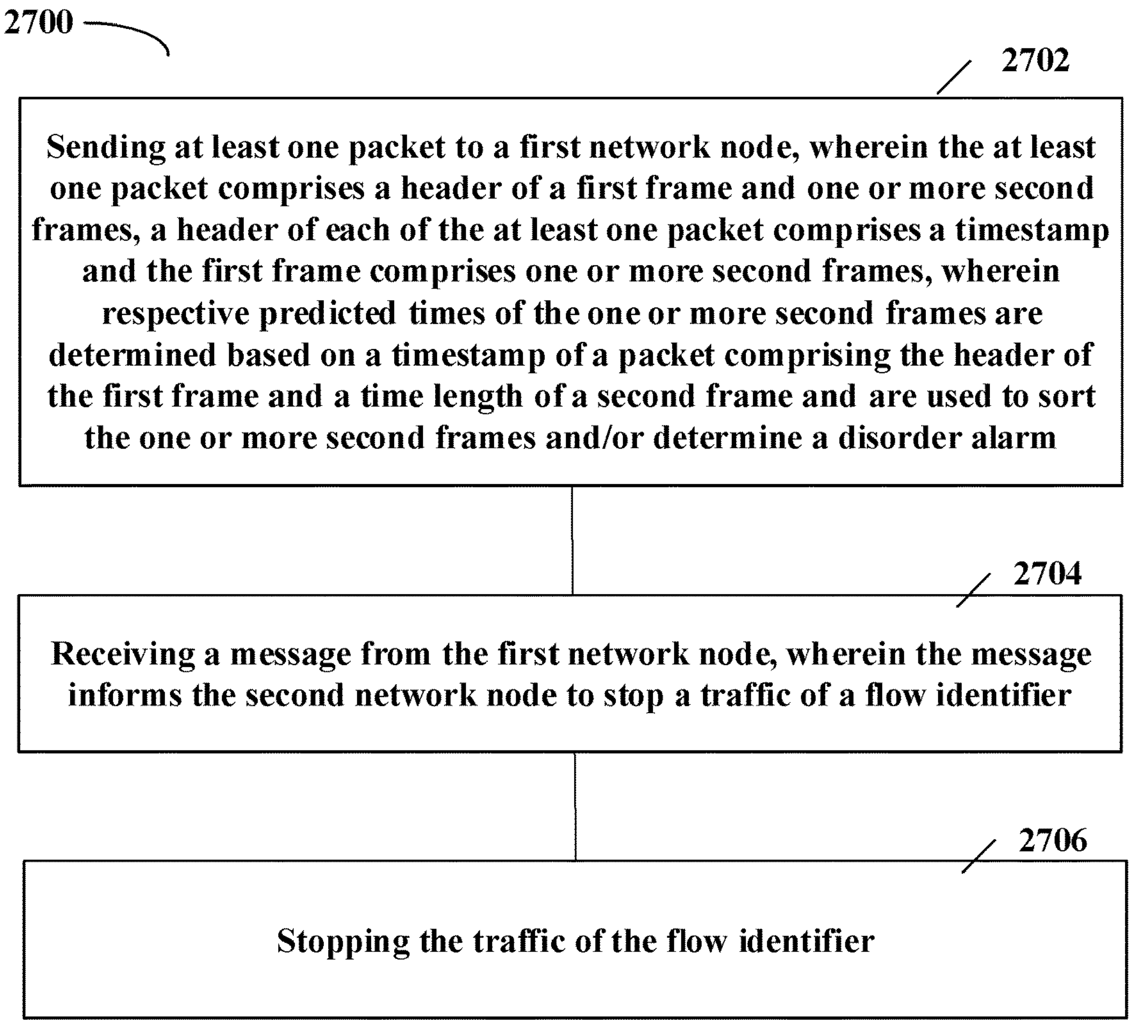
FIG. 27 shows a flowchart of a method according to another embodiment of the present disclosure.

FIG. 27 shows a flowchart of a method according to another embodiment of the present disclosure, which may be performed by an apparatus implemented in or as or communicatively coupled to a second network node or any other entity having similar functionality. As such, the second network node may provide means or modules for accomplishing various parts of the method 2700 as well as means or modules for accomplishing other processes in conjunction with other components. For some parts which have been described in the above embodiments, detailed description thereof is omitted here for brevity.

At block 2702, the second network node may send at least one packet to a first network node. The at least one packet comprises a header of a first frame and one or more second frames, a header of each of the at least one packet comprises a timestamp and the first frame comprises one or more second frames.

In an embodiment, the at least one packet is an Ethernet packet.

In an embodiment, the first network node is a Radio over Ethernet (RoE) device and the second network node is a RoE device.

Respective predicted times of the one or more second frames are determined based on a timestamp of a packet comprising the header of the first frame and a time length of a second frame and are used to sort the one or more second frames and/or determine a disorder alarm.

At block 2704, the second network node may receive a message from the first network node. The message informs the second network node to stop a traffic of a flow identifier.

In an embodiment, the message comprises at least one of a message type indicating that the message is used to inform a peer network node to stop a traffic of the flow identifier, or a reason indicating stopping the traffic of the flow identifier.

At block 2706, the second network node may stop the traffic of the flow identifier.

Figure 28:
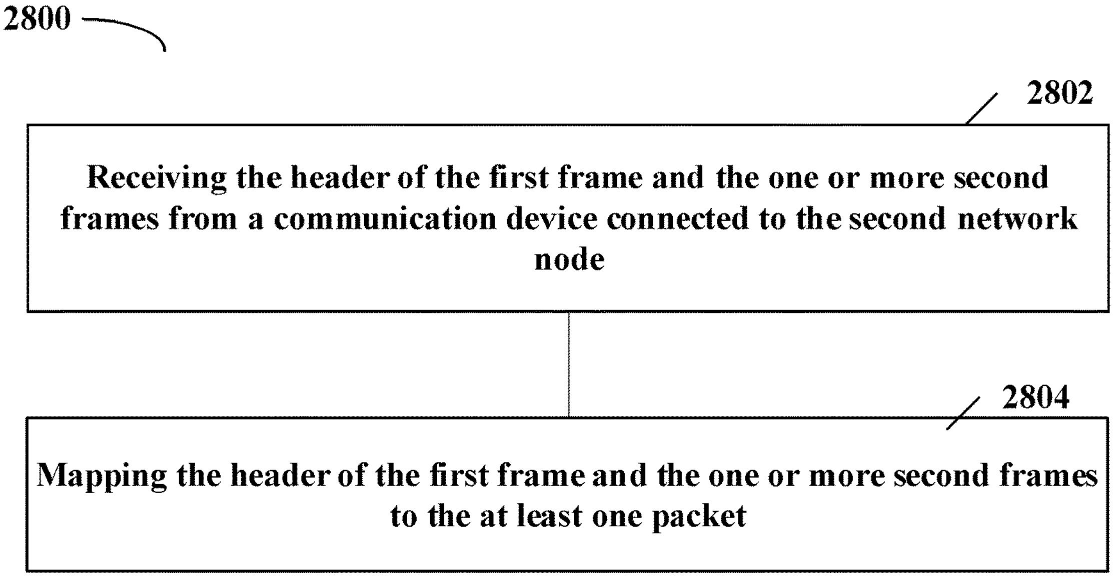
FIG. 28 shows a flowchart of a method according to another embodiment of the present disclosure.

FIG. 28 shows a flowchart of a method according to another embodiment of the present disclosure, which may be performed by an apparatus implemented in or as or communicatively coupled to a second network node or any other entity having similar functionality. As such, the second network node may provide means or modules for accomplishing various parts of the method 2800 as well as means or modules for accomplishing other processes in conjunction with other components. For some parts which have been described in the above embodiments, detailed description thereof is omitted here for brevity.

At block 2802, the second network node may receive the header of the first frame and the one or more second frames from a communication device connected to the second network node.

In an embodiment, the communication device connected to the second network node comprises at least one of a Baseband Unit (BBU), a Remote Radio Unit (RRU), a Radio Equipment Control (REC), or a Radio Equipment (RE).

In an embodiment, the first frame is a common public radio interface (CPRI) hyper frame and the second frame is a CPRI basic frame.

At block 2804, the second network node may map the header of the first frame and the one or more second frames to the at least one packet.

For example, when the first and second network nodes are RoE devices, the first frame is a CPRI hyper frame and the second frame is a CPRI basic frame, the CPRI specification 7.0 has described the map operation.

Embodiments herein afford many advantages, of which a non-exhaustive list of examples follows. Some embodiments herein provide a novel packet sorting mechanism (for example based on CPRI rate, Basic Frame (BF) number and timestamp) to solve the above mentioned problems. In some embodiments herein, if the packets are out of order so badly that basic services are affected, some alarms can be reported to tell customer something unexpected happen, this could improve product usability. In some embodiments herein, by the proposed method, it could efficiently avoid RAN (Radio Access Network) crash caused by disorder packets. In some embodiments herein, the network node can report an alarm to let customer aware if the disorder issue is too serious or unacceptable. In some embodiments herein, through the proposed sorting mechanism, the issue of packets disorder which seriously impact RAN service could be avoided or mitigated. In some embodiments herein, a flow such as RoE flow which stops working because too many disorder packets can be automatically stopped to decrease transmission pressure. The disorder event could be reported to customer to avoid further service issues. In some embodiments herein, the proposed solution can provide packet automation sort function. In some embodiments herein, the proposed solution can provide a function of traffic control based on flow packet order status. The embodiments herein are not limited to the features and advantages mentioned above. A person skilled in the art will recognize additional features and advantages upon reading the following detailed description.

Figure 29:
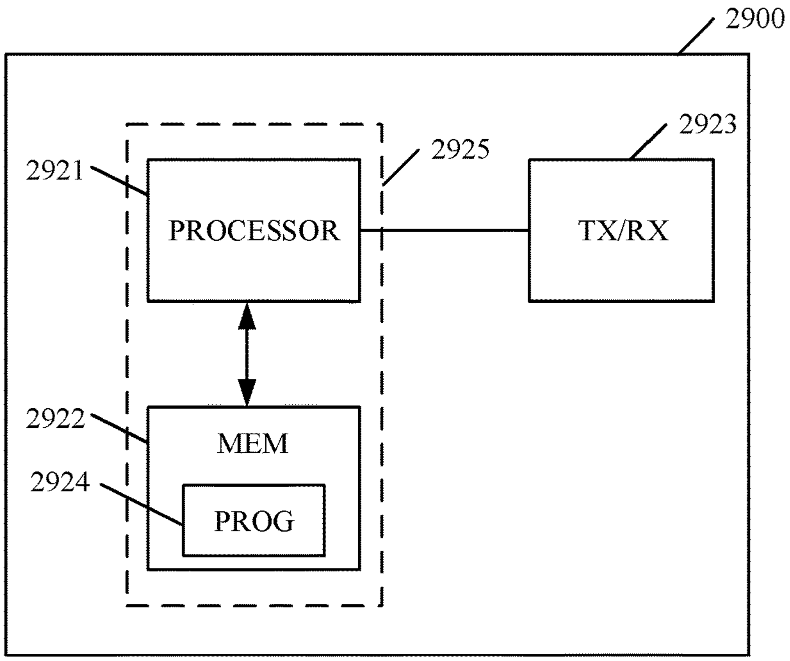
FIG. 29 is a block diagram showing an apparatus suitable for use in practicing some embodiments of the disclosure.

FIG. 29 is a block diagram showing an apparatus suitable for use in practicing some embodiments of the disclosure. For example, any one of the first network node or the second network node described above may be implemented through the apparatus 2900.

The apparatus 2900 comprises at least one processor 2921, such as a DP, and at least one MEM 2922 coupled to the processor 2921. The apparatus 2920 may further comprise a transmitter TX and receiver RX 2923 coupled to the processor 2921. The MEM 2922 stores a PROG 2924. The PROG 2924 may include instructions that, when executed on the associated processor 2921, enable the apparatus 2920 to operate in accordance with the embodiments of the present disclosure. A combination of the at least one processor 2921 and the at least one MEM 2922 may form processing means 2925 adapted to implement various embodiments of the present disclosure.

Various embodiments of the present disclosure may be implemented by computer program executable by one or more of the processor 2921, software, firmware, hardware or in a combination thereof.

The MEM 2922 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 2921 may be of any type suitable to the local technical environment, and may include one or more of general purpose computers, special purpose computers, microprocessors, digital signal processors DSPs and processors based on multicore processor architecture, as non-limiting examples.

In an embodiment where the apparatus is implemented as or at the first network node, the memory 2922 contains instructions executable by the processor 2921, whereby the first network node operates according to any of the methods related to the first network node.

In an embodiment where the apparatus is implemented as or at the second network node, the memory 2922 contains instructions executable by the processor 2921, whereby the first network node operates according to any of the methods related to the second network node.

Figure 30:
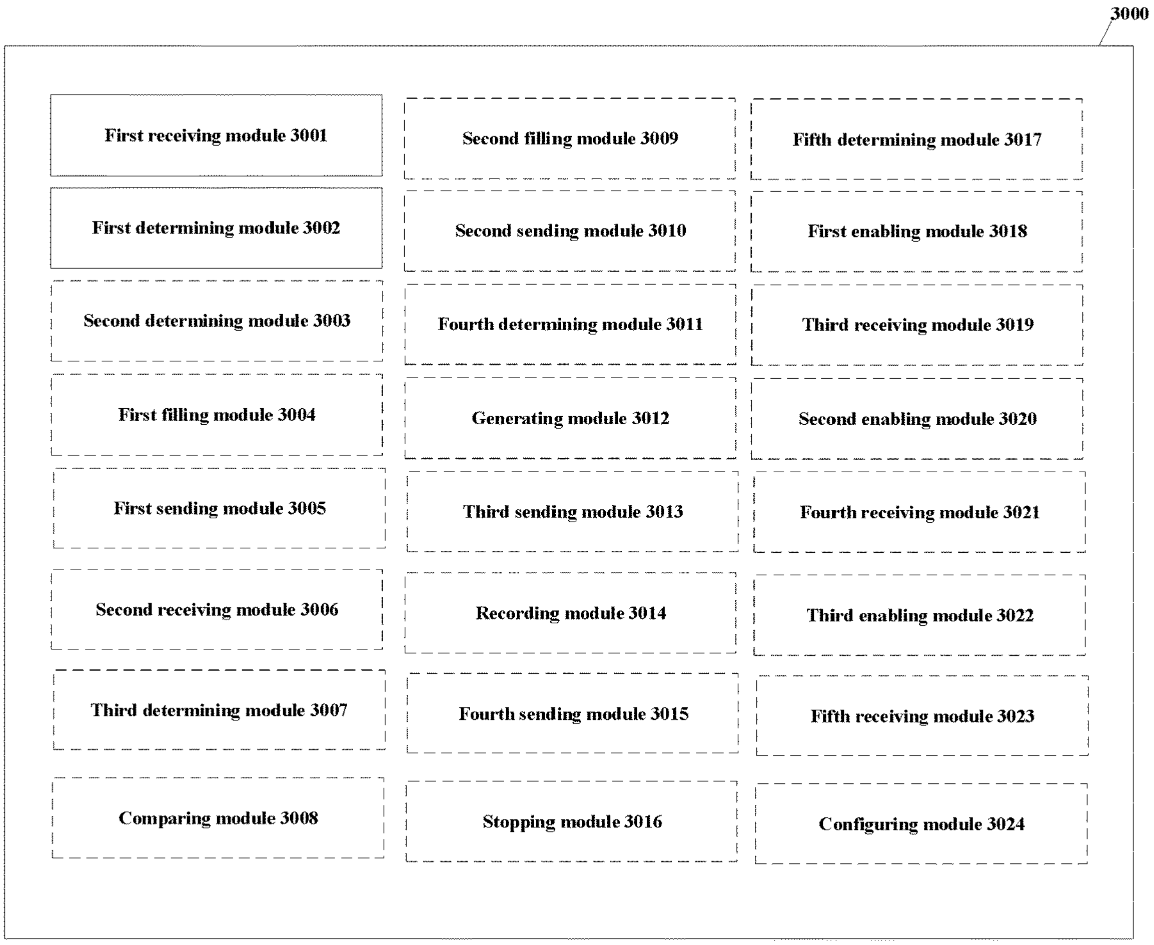
FIG. 30 is a block diagram showing a first network node according to an embodiment of the disclosure.

FIG. 30 is a block diagram showing a first network node according to an embodiment of the disclosure. As shown, the first network node 3000 comprises a first receiving module 3001 configured to receive a first packet comprising a header of a first frame from a second network node. A header of the first packet comprises a first timestamp and the first frame comprises one or more second frames. The first network node 3000 further comprises a first determining module 3002 configured to determine respective predicted times of the one or more second frames based on the first timestamp and a time length of a second frame. The respective predicted times of the one or more second frames are used to sort the one or more second frames and/or determine a disorder alarm.

In an embodiment, the first packet further comprises at least one second frame. The first network node 3000 further comprises a second determining module 3003 configured to determine respective time of the at least one second frame comprised in the first packet based on the first timestamp and the time length of the second frame. The first network node 3000 further comprises a first filling module 3004 configured to fill the at least one second frame comprised in the first packet into at least one corresponding first buffer cell based on the determined respective time of the at least one second frame comprised in the first packet. The first network node 3000 further comprises a first sending module 3005 configured to, when a time indicated by the first timestamp is reached, send the at least one second frame in the at least one corresponding first buffer cell to a communication device connected to the first network node.

In an embodiment, the first network node 3000 further comprises a second receiving module 3006 configured to receive a second packet comprising at least one second frame from the second network node. A header of the second packet comprises a second timestamp.

In an embodiment, the first network node 3000 further comprises a third determining module 3007 configured to determine respective time of the at least one second frame comprised in the second packet based on the second timestamp and the time length of the second frame.

In an embodiment, the first network node 3000 further comprises a comparing module 3008 configured to compare the determined respective time of the at least one second frame comprised in the second packet with the respective predicted times of the one or more second frames.

In an embodiment, the first network node 3000 further comprises a second filling module 3009 configured to fill the at least one second frame comprised in the second packet into at least one corresponding second buffer cell based on a comparison result.

In an embodiment, the first network node 3000 further comprises a second sending module 3010 configured to, when a time indicated by the second timestamp is reached, sending the at least one second frame in the at least one corresponding second buffer cell to a communication device connected to the first network node.

In an embodiment, the first network node 3000 further comprises a fourth determining module 3011 configured to determine a percentage of empty buffer cells for a flow identifier when a time is reached to send at least one second frame in at least one buffer cell to a communication device connected to the first network node.

In an embodiment, the first network node 3000 further comprises a generating module 3012 configured to, when the percentage of empty buffer cells exceeds a threshold, generate a disorder alarm for the flow identifier.

In an embodiment, the first network node 3000 further comprises a third sending module 3013 configured to send the disorder alarm to a network management device.

In an embodiment, the first network node 3000 further comprises a recording module 3014 configured to record the disorder alarm in the first network node.

In an embodiment, the first network node 3000 further comprises a fourth sending module 3015 configured to send a message to a second network node. The message informs the second network node to stop a traffic of the flow identifier.

In an embodiment, the first network node 3000 further comprises a stopping module 3016 configured to stop the traffic of the flow identifier.

In an embodiment, the first network node 3000 further comprises a fifth determining module 3017 configured to determine a disorder packet event based on a sequence number of a packet for a flow identifier received from the second network node.

In an embodiment, the first network node 3000 further comprises a first enabling module 3018 configured to enable a reorder function in the first network node based on the disorder packet event.

In an embodiment, the first network node 3000 further comprises a third receiving module 3019 configured to receive a message comprising a first indication of enabling a reorder function in the first network node from a network management device.

In an embodiment, the first network node 3000 further comprises a second enabling module 3020 configured to enable the reorder function in the first network node based on the first indication.

In an embodiment, the first network node 3000 further comprises a fourth receiving module 3021 configured to receive a message comprising a second indication of enabling a disorder alarm function in the first network node from a network management device In an embodiment, the first network node 3000 further comprises a third enabling module 3022 configured to enable the disorder alarm function in the first network node based on the second indication.

In an embodiment, the first network node 3000 further comprises a fifth receiving module 3023 configured to receiving a message comprising a third indication of a number of buffer cells.

In an embodiment, the first network node 3000 further comprises a configuring module 3024 configured to configure buffer cells based on the number of buffer cells.

Figure 31:
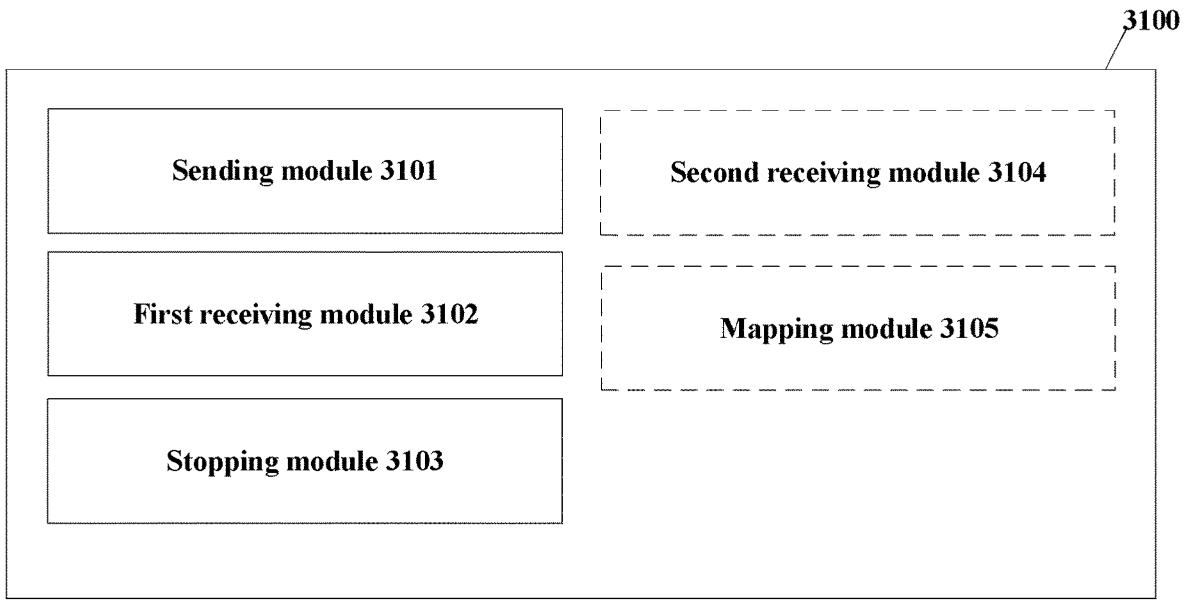
FIG. 31 is a block diagram showing a second network node according to an embodiment of the disclosure.

FIG. 31 is a block diagram showing a second network node according to an embodiment of the disclosure. As shown, the second network node 3100 comprises a sending module 3101 configured to send at least one packet to a first network node. The at least one packet comprises a header of a first frame and one or more second frames, a header of each of the at least one packet comprises a timestamp and the first frame comprises one or more second frames. The second network node 3100 further comprises a first receiving module 3102 configured to receive a message from the first network node. The message informs the second network node to stop a traffic of a flow identifier. The second network node 3100 further comprises a stopping module 3103 configured to stop the traffic of the flow identifier. Respective predicted times of the one or more second frames are determined based on a timestamp of a packet comprising the header of the first frame and a time length of a second frame and are used to sort the one or more second frames and/or determine a disorder alarm.

In an embodiment, the second network node 3100 further comprises a second receiving module 3104 configured to receive the header of the first frame and the one or more second frames from a communication device connected to the second network node.

In an embodiment, the second network node 3100 further comprises a mapping module 3105 configured to map the header of the first frame and the one or more second frames to the at least one packet.

According to an aspect of the disclosure it is provided a computer program product being tangibly stored on a computer readable storage medium and including instructions which, when executed on at least one processor, cause the at least one processor to carry out any of the methods as described above.

According to an aspect of the disclosure it is provided a computer-readable storage medium storing instructions which when executed by at least one processor, cause the at least one processor to carry out any of the methods as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a first network node, comprising:

receiving a first packet comprising a header of a first frame from a second network node, wherein a header of the first packet comprises a first timestamp and the first frame comprises one or more second frames;

determining respective predicted times of the one or more second frames based on the first timestamp and a time length of a second frame, wherein the respective predicted times of the one or more second frames are used to sort the one or more second frames and/or determine a disorder alarm;

determining a percentage of empty buffer cells for a flow identifier when a time is reached to send at least one second frame in at least one buffer cell to a communication device connected to the first network node; and when the percentage of empty buffer cells exceeds a threshold, generating a disorder alarm for the flow identifier.

2. The method according to claim 1, wherein the first packet further comprises at least one second frame, the method further comprises:

determining respective time of the at least one second frame comprised in the first packet based on the first timestamp and the time length of the second frame;

filling the at least one second frame comprised in the first packet into at least one corresponding first buffer cell based on the determined respective time of the at least one second frame comprised in the first packet; and when a time indicated by the first timestamp is reached, sending the at least one second frame in the at least one corresponding first buffer cell to a communication device connected to the first network node.

3. The method according to claim 1, further comprising:

receiving a second packet comprising at least one second frame from the second network node, wherein a header of the second packet comprises a second timestamp;

determining respective time of the at least one second frame comprised in the second packet based on the second timestamp and the time length of the second frame;

comparing the determined respective time of the at least one second frame comprised in the second packet with the respective predicted times of the one or more second frames;

filling the at least one second frame comprised in the second packet into at least one corresponding second buffer cell based on a comparison result; and when a time indicated by the second timestamp is reached, sending the at least one second frame in the at least one corresponding second buffer cell to a communication device connected to the first network node.

4. The method according to claim 2, wherein the communication device connected to the first network node comprises at least one of:

a Baseband Unit (BBU), a Remote Radio Unit (RRU), a Radio Equipment Control (REC), or a Radio Equipment (RE).

5. The method according to claim 1, wherein the first frame is a common public radio interface (CPRI) hyper frame and the second frame is a CPRI basic frame; and wherein the first network node is a Radio over Ethernet (RoE) device and the second network node is a RoE device.

6. The method according to claim 1, wherein the packet received from the second network node is an Ethernet packet.

7. The method according to claim 1, further comprising:

sending the disorder alarm to a network management device; and/or recording the disorder alarm in the first network node.

8. The method according to claim 1, further comprising:

sending a message to a second network node, wherein the message informs the second network node to stop a traffic of the flow identifier; and stopping the traffic of the flow identifier;

wherein the message comprises at least one of:

a message type indicating that the message is used to inform a peer network node to stop a traffic of the flow identifier; and a reason indicating stopping the traffic of the flow identifier.

9. The method according to claim 1, further comprising:

determining a disorder packet event based on a sequence number of a packet for a flow identifier received from the second network node; and enabling a reorder function in the first network node based on the disorder packet event.

10. The method according to claim 1, further comprising:

receiving a message comprising a first indication of enabling a reorder function in the first network node from a network management device; and enabling the reorder function in the first network node based on the first indication.

11. The method according to claim 1, further comprising:

receiving a message comprising a second indication of enabling a disorder alarm function in the first network node from a network management device; and enabling the disorder alarm function in the first network node based on the second indication.

12. The method according to claim 1, further comprising:

receiving a message comprising a third indication of a number of buffer cells; and configuring buffer cells based on the number of buffer cells.

13. A method performed by a second network node, comprising:

sending at least one packet to a first network node, wherein the at least one packet comprises a header of a first frame and one or more second frames, a header of each of the at least one packet comprises a timestamp and the first frame comprises one or more second frames;

receiving a message from the first network node, wherein the message informs the second network node to stop a traffic of a flow identifier, wherein the message is based on the first network node determining a percentage of empty buffer cells for a flow identifier when a time is reached to send at least one second frame in at least one buffer cell to a communication device connected to the first network node where the percentage of empty buffer cells exceeds a threshold, causing the first network node to generate a disorder alarm for the flow identifier; and stopping the traffic of the flow identifier, wherein respective predicted times of the one or more second frames are determined based on a timestamp of a packet comprising the header of the first frame and a time length of a second frame and are used to sort the one or more second frames and/or determine a disorder alarm.

14. The method according to claim 13, wherein the message comprises at least one of:

a message type indicating that the message is used to inform a peer network node to stop a traffic of the flow identifier, or a reason indicating stopping the traffic of the flow identifier.

15. The method according to claim 13, further comprising:

receiving the header of the first frame and the one or more second frames from a communication device connected to the second network node; and mapping the header of the first frame and the one or more second frames to the at least one packet.

16. The method according to claim 15, wherein the communication device connected to the second network node comprises at least one of:

a Baseband Unit (BBU), a Remote Radio Unit (RRU), a Radio Equipment Control (REC), or a Radio Equipment (RE).

17. The method according to claim 13, wherein the first frame is a common public radio interface (CPRI) hyper frame and the second frame is a CPRI basic frame; and wherein the first network node is a Radio over Ethernet (RoE) device and the second network node is a RoE device.

18. The method according to claim 13, wherein the at least one packet is an Ethernet packet.

19. A first network node, comprising:

a processor; and a memory coupled to the processor, said memory containing instructions executable by said processor, whereby said first network node is operative to:

receive a first packet comprising a header of a first frame from a second network node, wherein a header of the first packet comprises a first timestamp and the first frame comprises one or more second frames;

determine respective predicted times of the one or more second frames based on the first timestamp and a time length of a second frame, wherein the respective predicted times of the one or more second frames are used to sort the one or more second frames and/or determine a disorder alarm;

determine a percentage of empty buffer cells for a flow identifier when a time is reached to send at least one second frame in at least one buffer cell to a communication device connected to the first network node; and when the percentage of empty buffer cells exceeds a threshold, generate a disorder alarm for the flow identifier.

* * * * *